US012771442B2

(12) United States Patent
Saget et al.

(10) Patent No.: US 12,771,442 B2
(45) Date of Patent: Oct. 20, 2026

(54) OPTICAL FIBER MONITORING

(71) Applicant: VIAVI SOLUTIONS INC., Chandler, AZ (US)

(72) Inventors: Michel Saget, Saint-Etienne (FR); Sylvain Desplat, Lyons (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 186 days.

(21) Appl. No.: 18/121,478

(22) Filed: Mar. 14, 2023

(65) Prior Publication Data

US 2024/0223274 A1 Jul. 4, 2024

(30) Foreign Application Priority Data

Jan. 2, 2023 (EP) .................................... 23305002

(51) Int. Cl.
*H04B 10/071* (2013.01)
*H04B 10/25* (2013.01)

(52) U.S. Cl.
CPC ........... *H04B 10/071* (2013.01); *H04B 10/25* (2013.01)

(58) Field of Classification Search
CPC .............................. H04B 10/071; H04B 10/25
USPC ............................................... 398/17–21, 31
See application file for complete search history.

(56) References Cited

U.S. PATENT DOCUMENTS 4,449,043 A * 5/1984 Husbands ............ H04B 10/564 250/227.24
5,321,541 A * 6/1994 Cohen ................ H04B 10/0799 398/92
5,396,569 A * 3/1995 Yanagawa .............. H04B 10/07 356/417
6,310,702 B1 * 10/2001 Minami ............... H04B 10/071 356/73
6,512,610 B1 * 1/2003 Minami ............. G01M 11/3136 356/73.1
9,240,855 B1 * 1/2016 Lam ................... G01M 11/3109
9,435,712 B2 * 9/2016 Chen ................ H04B 10/07955
2006/0007426 A1 * 1/2006 Weller ................. H04B 10/071 356/73.1
2008/0031624 A1 * 2/2008 Smith .................. H04B 10/071 398/71
2009/0190921 A1 * 7/2009 Nakajima .......... G01M 11/3136 398/21

(Continued)

FOREIGN PATENT DOCUMENTS

CN 109039440 A * 12/2018 ........... H04B 10/071
CN 118232992 A * 6/2024
GB 2582895 A * 10/2020 ........... H04B 10/071

OTHER PUBLICATIONS

EPO, "Office Action for European Patent Application No. 23217460.7", dated Jan. 23, 2026, 7 pages.

(Continued)

*Primary Examiner* — Li Liu
(74) *Attorney, Agent, or Firm* — Mannava & Kang, P.C.

(57) ABSTRACT

According to examples, an optical fiber monitoring apparatus may include an optical time domain reflectometer (OTDR), and a 1×N optical splitter that is optically connected to the OTDR. For N being greater than one, the 1×N optical splitter may include N test port optical fiber outputs. Further, each test port optical fiber output may be optically connectable to an optical fiber to optically connect the optical fiber to the OTDR.

19 Claims, 27 Drawing Sheets

(56) References Cited

U.S. PATENT DOCUMENTS

| | | | | |
|---|---|---|---|---|
| 2011/0026923 A1* | 2/2011 | Kim | H04J 14/025 | 359/344 |
| 2011/0135306 A1* | 6/2011 | Kim | H04J 14/0252 | 398/68 |
| 2011/0153543 A1* | 6/2011 | Woodward | G01M 11/3172 | 356/73.1 |
| 2011/0153544 A1* | 6/2011 | Nagel | H04B 10/071 | 706/54 |
| 2011/0268438 A1* | 11/2011 | Daems | H04B 10/071 | 398/16 |
| 2012/0121252 A1* | 5/2012 | Kim | H04J 14/0276 | 398/16 |
| 2013/0259469 A1* | 10/2013 | Smith | H04J 14/0282 | 398/16 |
| 2013/0294768 A1* | 11/2013 | Lee | H04B 10/071 | 398/33 |
| 2014/0126900 A1* | 5/2014 | Urban | H04B 10/0771 | 398/13 |
| 2014/0133847 A1* | 5/2014 | Vall-Llosera | H04J 14/0247 | 398/21 |
| 2015/0023658 A1* | 1/2015 | Vilela De Faria | H04B 10/071 | 398/21 |
| 2016/0173194 A1* | 6/2016 | Zhou | H04B 10/071 | 398/21 |
| 2017/0134113 A1* | 5/2017 | Lam | H04Q 11/0067 | |
| 2018/0019813 A1 | 1/2018 | Archambault et al. | | |
| 2019/0028190 A1* | 1/2019 | Hou | H04B 10/27 | |
| 2020/0072703 A1* | 3/2020 | Roux | G01M 11/3145 | |
| 2020/0200592 A1* | 6/2020 | Huang | H04B 10/071 | |
| 2020/0252125 A1* | 8/2020 | Martel | H04B 10/27 | |
| 2020/0292416 A1* | 9/2020 | Gagnon | H04B 10/07955 | |
| 2021/0080349 A1* | 3/2021 | Champavere | G01M 11/3154 | |
| 2023/0013084 A1* | 1/2023 | Perry | H04B 10/614 | |
| 2024/0146410 A1* | 5/2024 | Dawson-Elli | H04B 10/272 | |

OTHER PUBLICATIONS

Nakazawa Masataka et al: "Nondestructive measurement of mode couplings along a multi-core fiber using a synchronous multi-channel OTDR", Optics Express, vol. 20, No. 11, May 18, 2012 (May 18, 2012), p. 12530, XP093355157, ISSN: 1094-4087, DOI: 10.1364/OE. 20.012530.

* cited by examiner

OPTICAL FIBER MONITORING

PRIORITY

The present application claims priority under 35 U.S.C. 119(a)-(d) to European patent application number 23305002.0, having a filing date of Jan. 2, 2023, the disclosure of which is hereby incorporated by reference in its entirety.

BACKGROUND

A fiber optic cable may include one or more optical fibers that may be used to transmit light from a source to a destination. The optical fibers of the fiber optic cable may be referred to as fiber optic links. Fiber optic cables may represent a network element of a fiber optic network. In this regard, other types of network elements may include optical connectors, optical splices, optical couplers, and optical switches. Testing of a fiber optic link may be performed, for example, for installation and other purposes. An optical time domain reflectometer (OTDR) may be a reference tool that may be utilized for monitoring fiber optic links. Monitoring systems may need to be able to automatically perform tests on several optical fibers when there may be several optical fibers that are to be tested per cable and/or several cables that are to be tested. Connecting the OTDR to different cables may be performed by utilizing optical switches that sequentially connect the OTDR to the different optical fibers under test. Adding active components (e.g., optical switches) may add complexity and cost to the monitoring solution.

BRIEF DESCRIPTION OF DRAWINGS

Features of the present disclosure may be illustrated by way of examples shown in the following figures. In the following figures, like numerals indicate like elements, in which.

DETAILED DESCRIPTION

Figure 1:
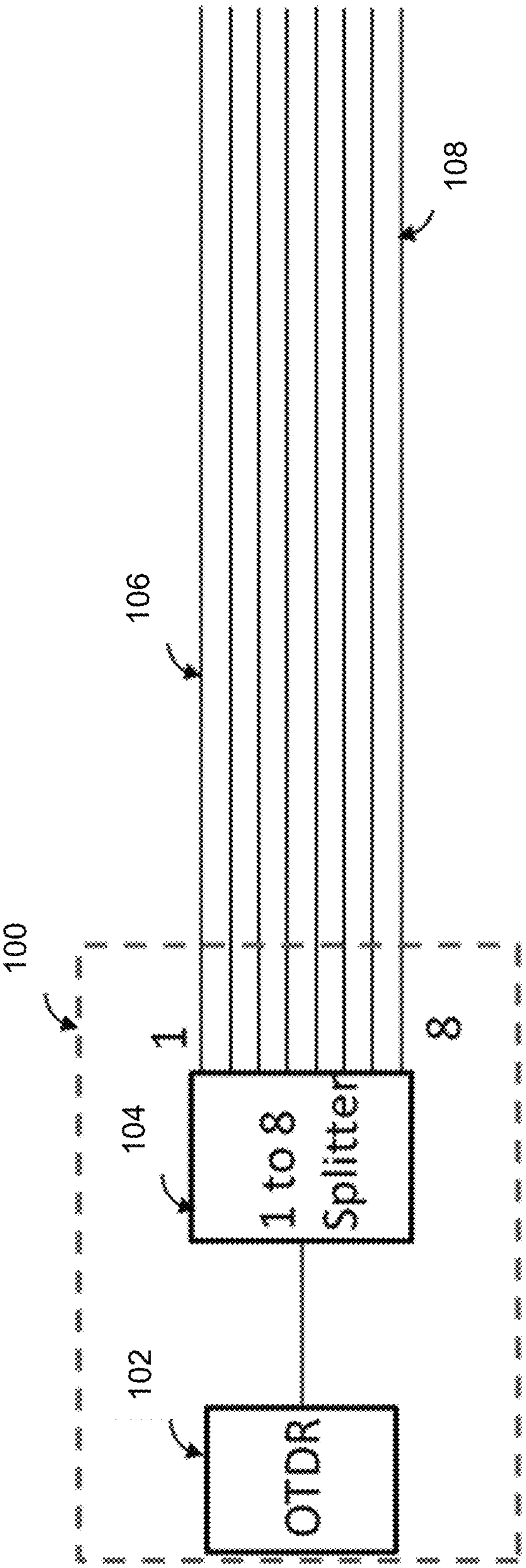
FIG. 1 illustrates an optical fiber monitoring apparatus, according to an example of the present disclosure.

For simplicity and illustrative purposes, the present disclosure is described by referring mainly to examples thereof. In the following description, details may be set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

According to examples disclosed herein, an optical fiber monitoring apparatus may include an optical time domain reflectometer (OTDR), and a 1×N optical splitter that is optically connected to the OTDR. For N being greater than one, the 1×N optical splitter may include N test port optical fiber outputs. Further, each test port optical fiber output may be optically connectable to an optical fiber to optically connect the optical fiber to the OTDR.

For the optical fiber monitoring apparatus described above, the OTDR may be optically connected to N optical fibers including the optical fiber to extract, from each optical fiber of the N optical fibers, information by analyzing signals returned from the N optical fibers to the N test port optical fiber outputs.

For the optical fiber monitoring apparatus described above, the OTDR may be optically connected to N optical fibers including the optical fiber to compare, for the N optical fibers, N simultaneous test results to a reference test result to identify changes on at least one optical fiber under test of the N optical fibers.

The optical fiber monitoring apparatus described above may further include an optical switch optically inserted between the OTDR and the 1×N optical splitter.

The optical fiber monitoring apparatus described above may further include N optical fibers of different lengths optically inserted between the N test port optical fiber outputs and N optical fibers including the optical fiber, where the N optical fibers may be optically connected to the N test port optical fiber outputs.

The optical fiber monitoring apparatus described above may further include N antennas connected to N optical fibers including the optical fiber, where the N optical fibers may be optically connected to the N test port optical fiber outputs.

For the optical fiber monitoring apparatus described above, the OTDR may be a multi-wavelength OTDR. In this regard, the apparatus may further include a multi-wavelength multiplexer/demultiplexer optically inserted between the OTDR and a plurality of 1×N splitters including the 1×N optical splitter.

For the optical fiber monitoring apparatus described above, the OTDR may be a simultaneous multi-channel OTDR. In this regard, the apparatus may further include a plurality of 1×N splitters including the 1×N optical splitter.

For the optical fiber monitoring apparatus described above, the OTDR may operate at a different wavelength than a traffic wavelength. In this regard, the apparatus may further include a wavelength dependent multiplexer to insert a test signal on the optical fiber.

According to examples disclosed herein, an optical fiber monitoring apparatus may include an optical source, an optical receiver, and an optical coupler optically inserted between the optical source, the optical receiver, and a 1× N optical splitter. For N greater than one, the 1×N optical splitter may include N test port optical fiber outputs. Further, each test port optical fiber output may be optically connectable to an optical fiber to optically connect the optical fiber to the optical source and the optical receiver.

For the optical fiber monitoring apparatus described above, the optical source may include a laser, and the optical receiver may include a photodiode.

For the optical fiber monitoring apparatus described above, the optical coupler may be an M-port optical coupler. In this regard, the optical coupler may include an additional output connected to an additional measurement port. In one example, M may be equal to three.

According to examples disclosed herein, an optical fiber monitoring apparatus may include an OTDR, and a 1×N optical splitter that is optically connected to the OTDR to test at least one optical fiber of N optical fibers that are optically connected to the 1×N optical splitter, where N is greater than one.

Figure 2A:
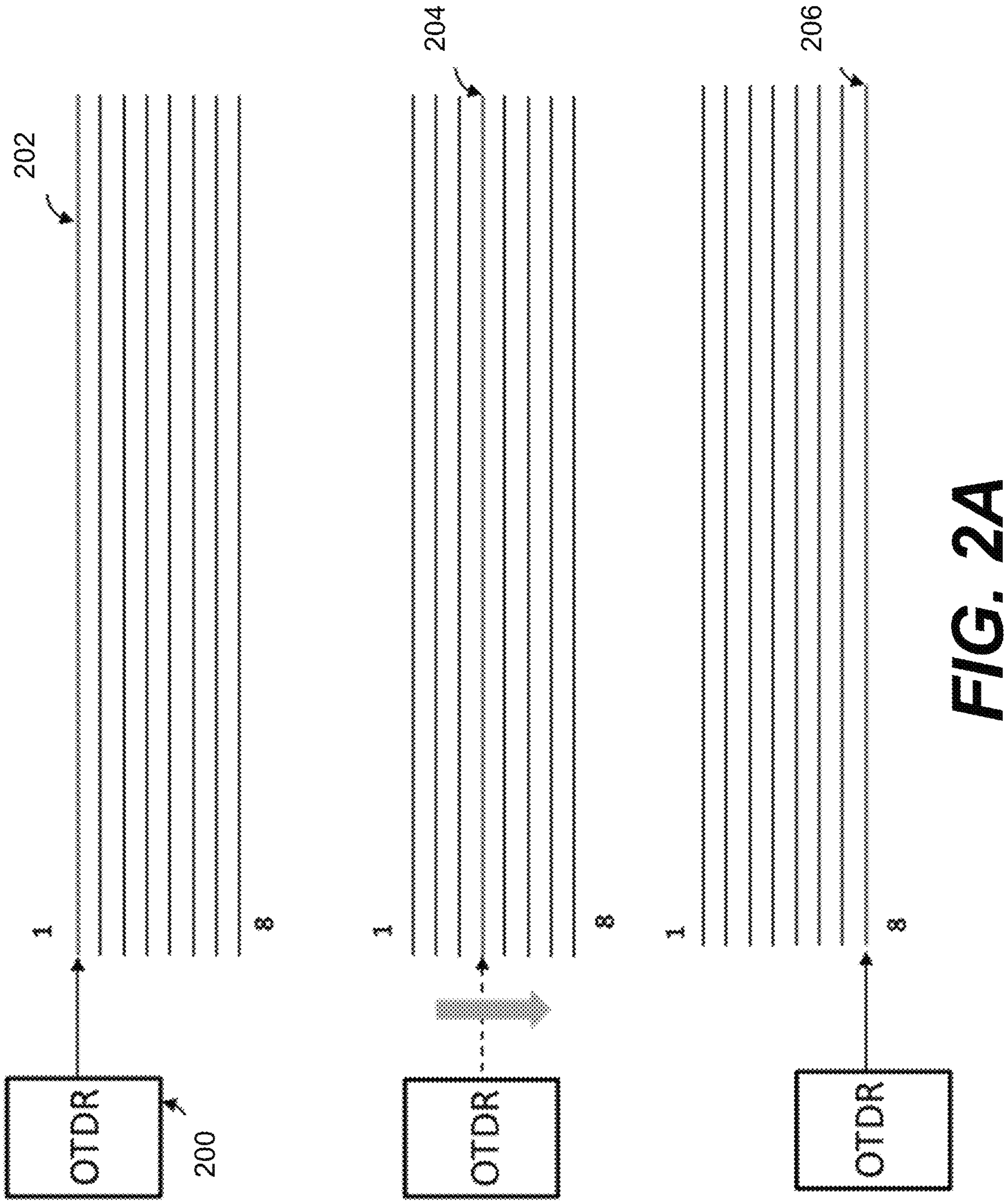
FIG. 2A illustrates testing of multiple optical fibers by utilizing an OTDR, according to an example of the present disclosure.

FIG. 2A illustrates testing of multiple optical fibers by utilizing an OTDR, according to an example of the present disclosure. Referring to FIG. 2A, with respect to optical fiber sensing generally, testing of multiple optical fibers using an OTDR may require successive connections of the OTDR to each of the optical fibers. As illustrated in FIG. 2A, an operator may connect an OTDR on near end 200 of a first optical fiber 202, then successively disconnect at 204, and then reconnect at 206 on the next optical fiber until having tested all of the optical fibers up to the last four.

Figure 2B:
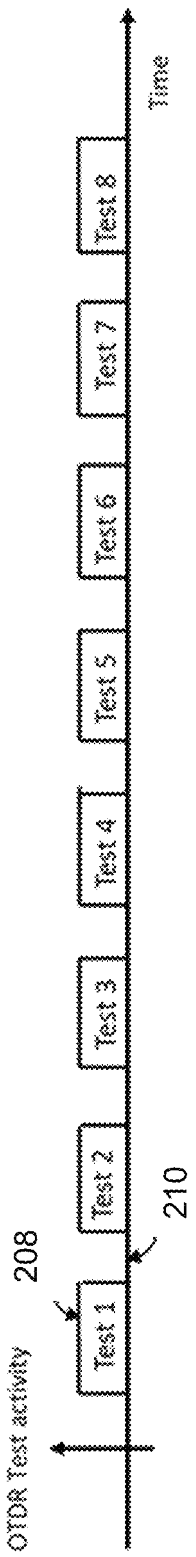
FIG. 2B illustrates testing of multiple optical fibers by utilizing an OTDR, according to an example of the present disclosure.

FIG. 2B illustrates testing of multiple optical fibers by utilizing an OTDR, according to an example of the present disclosure. Referring to FIG. 2B, with respect to testing of eight optical fibers, the duration of a test may be the sum of measurement periods 208 and transition periods 210 between two successive OTDR tests. For such a test, the manual switching may be time consuming and impact the total duration of the test of the eight optical fibers, thus making the measurement dependent on capabilities of the user that will perform the manipulation of the optical fibers. In addition, a test with manual switching may be acceptable for a single or a few optical fibers, but may not be practical for optical cable monitoring solutions due to the relatively large number of optical fibers that may need to be tested.

Figure 3A:
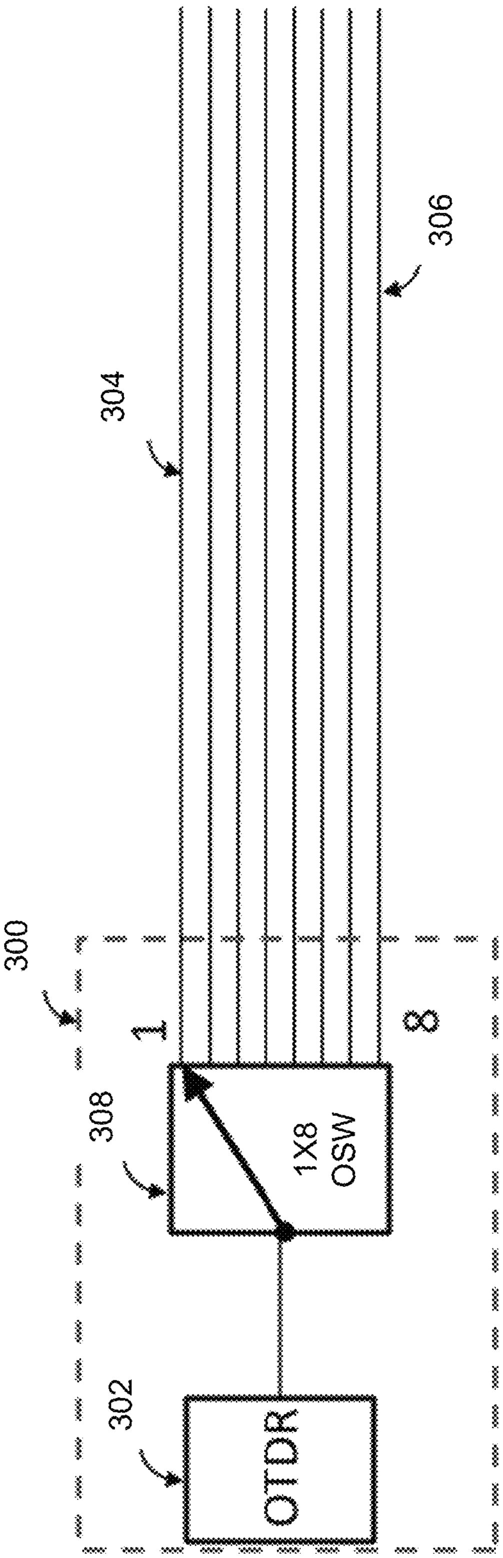
FIG. 3A illustrates automatic testing and/or monitoring of a plurality of optical fibers using optical switches, according to an example of the present disclosure.

FIG. 3A illustrates automatic testing and/or monitoring of a plurality of optical fibers using optical switches, according to an example of the present disclosure. Referring to FIG. 3A, for the automatic testing and/or monitoring performed at 300, OTDR 302 may be connected to different optical fibers from the first optical fiber 304 to the last optical fiber 306 using a 1×8 optical switch 308.

Figure 3B:
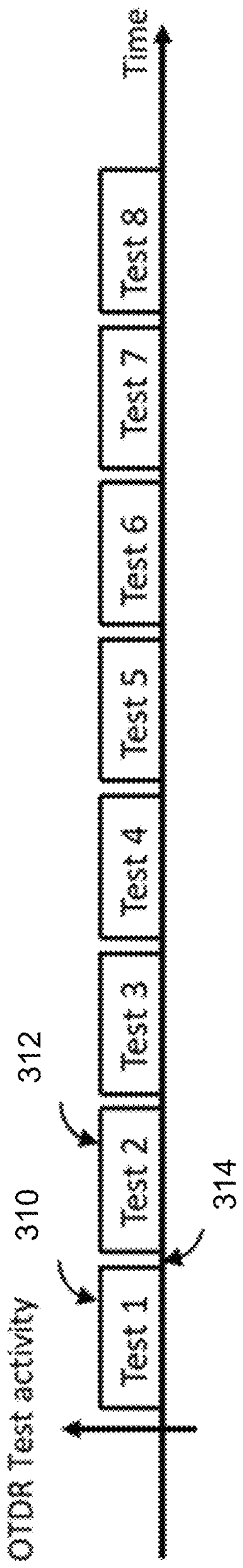
FIG. 3B illustrates a switching sequence, according to an example of the present disclosure.

FIG. 3B illustrates a switching sequence, according to an example of the present disclosure. The switching sequence illustrated in FIG. 3B shows the sequence between test phases (e.g., 310, 312) and transition phases 314. Switching may be performed automatically without manipulation of optical connectors by a user, and may thus be relatively faster and eliminate the risk of damage and/or pollution of the connectors during handling.

Figure 4:
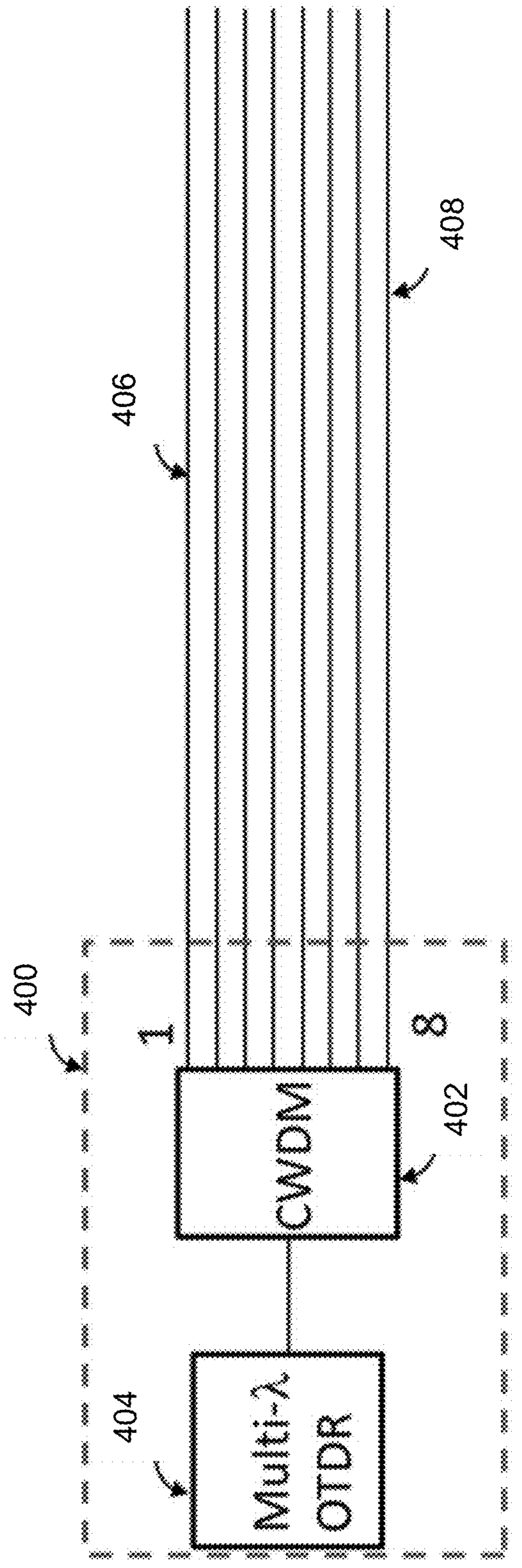
FIG. 4 illustrates utilization of an optical multiplexer/demultiplexer, according to an example of the present disclosure.

FIG. 4 illustrates utilization of an optical multiplexer/demultiplexer (e.g., Mux/deMux 402), according to an example of the present disclosure. Referring to FIG. 4, monitoring system 400 may integrate a multi-wavelength or a wavelength-tunable OTDR that allows measurements through the Mux/DeMux 402 using the wavelengths adapted to each channel of this component. In this regard, tests may be performed sequentially. A test wavelength of OTDR 404 may be set to that of output 1 of the Mux/DeMux 402 connected to the first optical fiber 406, then to the following optical fibers until the test of the last optical fiber 408 connected to output 8 of the Mux/DeMux 402. This solution may utilize a more sophisticated OTDR 404, where the transition time from one channel to the next may be potentially faster and more repeatable in terms of insertion loss. Additionally, time-division multiplexing (TDM) may utilize the Mux/DeMux 402, which may be a passive optical component.

Figure 5:
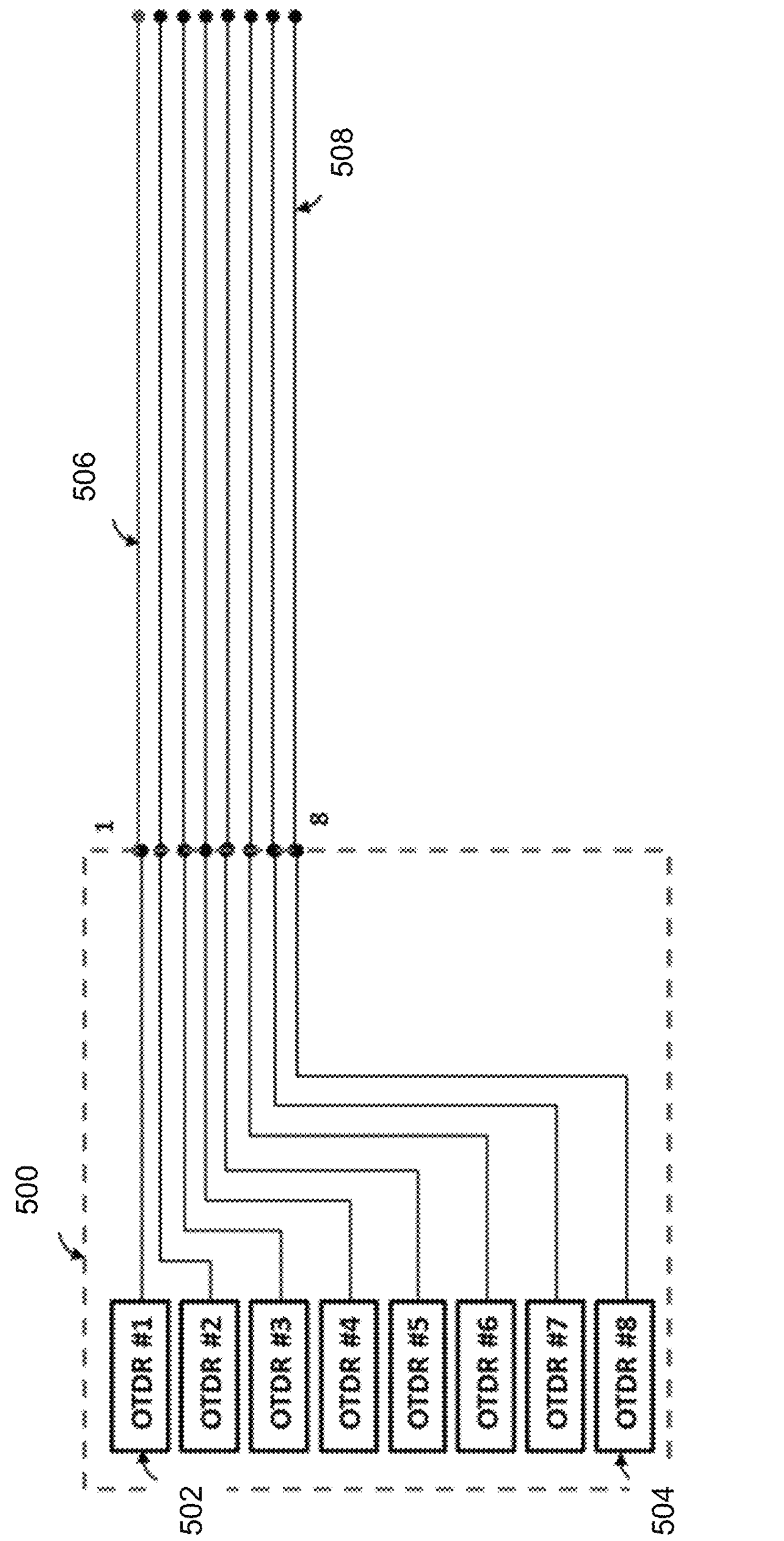
FIG. 5 illustrates testing of several optical fibers in parallel, according to an example of the present disclosure.

FIG. 5 illustrates testing of several optical fibers in parallel, according to an example of the present disclosure. Referring to FIG. 5, monitoring system 500 may include several OTDRs (e.g., eight OTDRs), from 502 to 504 that may operate simultaneously, thus reducing the test time. Measurements may be performed in parallel from the first optical fiber 506 to the last optical fiber 508. In this regard, several OTDRs may be combined by sharing certain hardware and/or software components in order to reduce the price or the system footprint.

The automatic monitoring solutions described in FIGS. 2-5 may be relatively expensive, and technically challenging to implement. In this regard and in order to address the various technical challenges disclosed herein, FIG. 1 illustrates an optical fiber monitoring apparatus (hereinafter "apparatus 100"), according to an example of the present disclosure. Referring to FIG. 1, for the apparatus 100, the number of optical fibers to be tested in parallel may be relatively small. For FIG. 1, fiber optic cables may be connected to 5G antennas. The apparatus 100 may include an OTDR 102 connected to optical fibers to be tested through an intermediate passive optical splitter 104. The passive optical splitter 104 may include a 1×N optical splitter (e.g., N=8) that may distribute power of the OTDR 102 on each of the optical fibers from 106 to 108. A measurement may be performed based on eight OTDR tests corresponding to each optical fiber. Since the optical fibers 106 to 108 include similar lengths, it may be technically challenging to differentiate the reflections present at the ends of each of the optical fibers under test. In this regard, the passive optical splitter 104 (which may replace an optical switch), may thus provide for cost reduction, power consumption reduction, and scanning time reduction.

Figure 6:
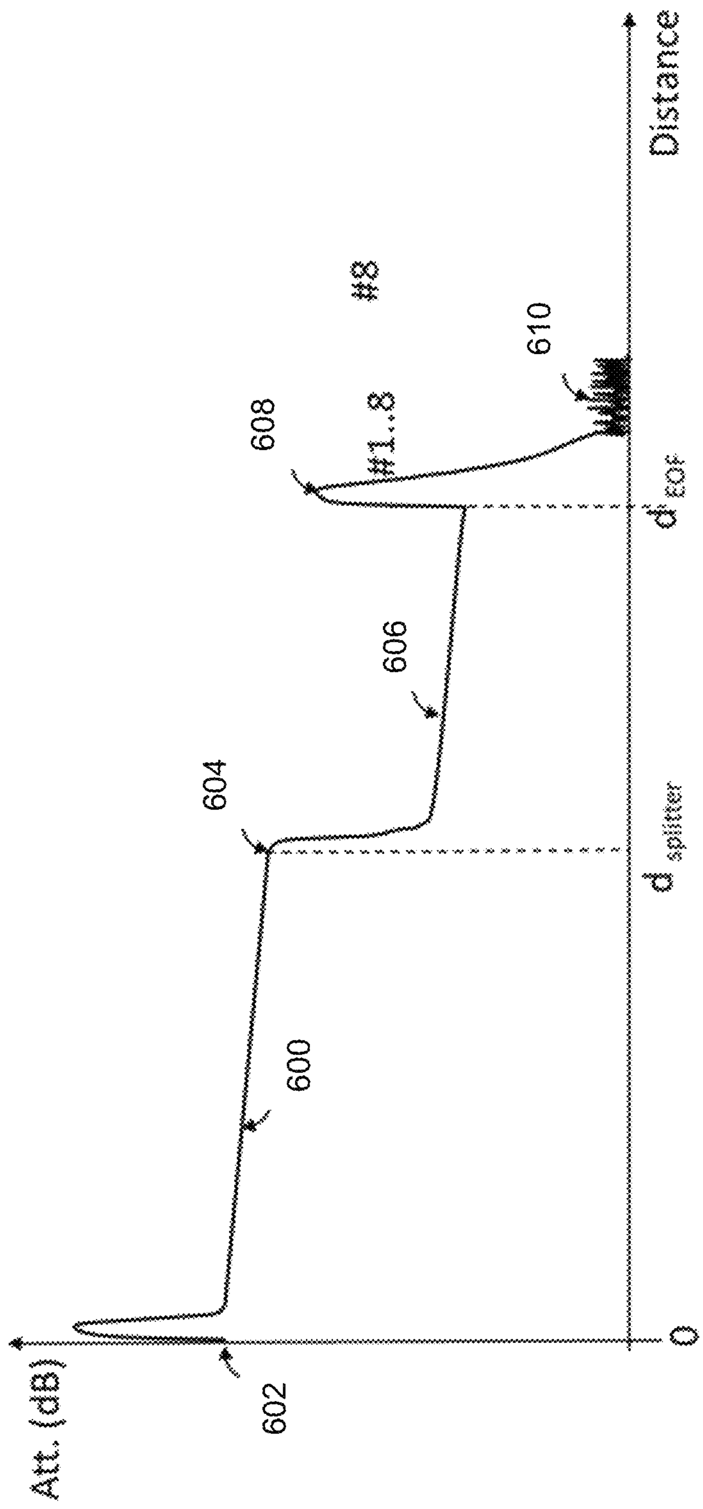
FIG. 6 illustrates a reflectometric curve obtained with the test configuration of FIG. 1, according to an example of the present disclosure.

FIG. 6 illustrates a reflectometric curve obtained with the test configuration of FIG. 1, according to an example of the present disclosure. Referring to FIG. 6, the OTDR trace may begin with section 600 upstream of the optical splitter located at the distance d splitter. Section 600 may be located between the reflection of a line start connector 602 and insertion loss 604 corresponding to the optical splitter 104. Section 606 may represent the combined result of the cumulative contributions of the eight optical fibers connected downstream of the optical splitter 104. Section 606 may be located between the point corresponding to the high insertion loss 604 of the splitter and the cumulative reflections of the optical fiber ends 608, preceding noise floor 610. If an optical fiber among the eight optical fibers is cut between the splitter distances and the optical fiber background, such a cut may be technically challenging to identify, particularly if the cut is relatively not reflective.

Figure 7:
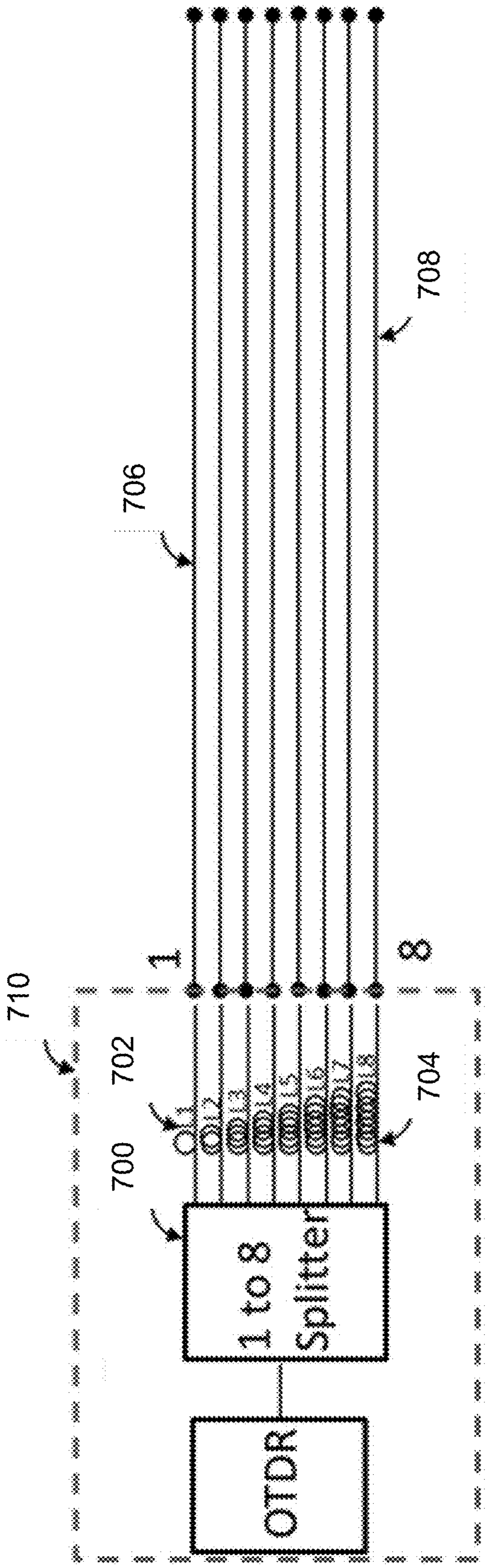
FIG. 7 illustrates another example of an optical fiber monitoring apparatus that addresses the technical challenges discussed with respect to FIG. 6 by inserting sections of optical fibers of different lengths between an optical splitter and optical fibers under test, according to an example of the present disclosure.

FIG. 7 illustrates another example of an optical fiber monitoring apparatus 710 that addresses the technical challenges discussed with respect to FIG. 6 by inserting sections of optical fibers of different lengths (e.g., 702 to 704) between optical splitter 700 and optical fibers under test (e.g., 706 to 708), according to an example of the present disclosure. By adding to the length of the optical fibers under test (e.g., 706 to 708), these sections 702 to 704 with different respective lengths may make it possible to shift the end of each optical fiber from each other optical fiber.

Figure 8:
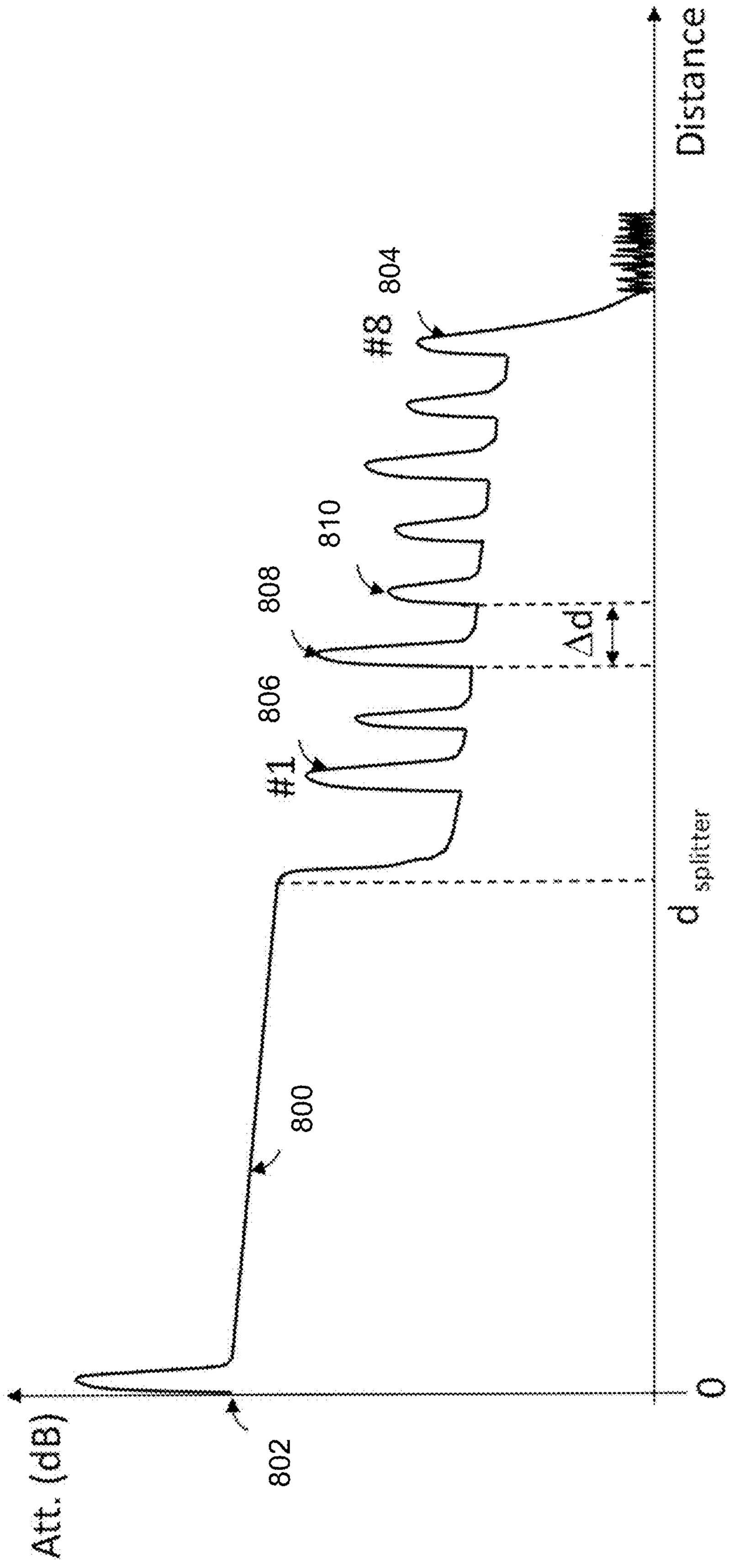
FIG. 8 illustrates an example of an OTDR trace obtained with the configuration of FIG. 7, according to an example of the present disclosure.

FIG. 8 illustrates an example of an OTDR trace obtained with the configuration of FIG. 7, according to an example of the present disclosure. Referring to FIG. 8, the OTDR trace may begin with section 800 upstream of the optical splitter located at the distance d splitter. Section 800 may be located between reflection 802 of the front end connector and the insertion loss located at the splitter location. For the distance between the optical splitter location d and the longest optical fiber 804, the OTDR trace may represent the sum of the contributions of each optical fiber. Thus, the reflective event may correspond to the end #1 of the first optical fiber 806. It may be thus possible to detect cuts in an optical fiber by the disappearance of the reflective event corresponding to its end. If the amplitude of the end reflection is known, it may be possible to estimate optical losses on the corresponding optical fiber by following the sum of the reflective peaks. In some cases however, the distance Δd between two adjacent reflective events (e.g., 808, 810) may be too small to be able to differentiate the events.

In some cases, dedicated reflectors may be connected to the end of the optical fibers to generate calibrated reflective signals which will be used as a reference to follow the attenuation of each optical fiber.

With continued reference to FIG. 8, the OTDR trace may vary according to factors such as the performance of the OTDR that is utilized, the configuration of the network under test, and the number N outputs of the 1 to N coupler. Thus, it may be possible to detect an excess loss or an optical fiber break using the end of optical fiber reflection as a reference. It may also be possible to locate faults at a distance based on the performance of the OTDR and the configuration of the network.

Figure 9:
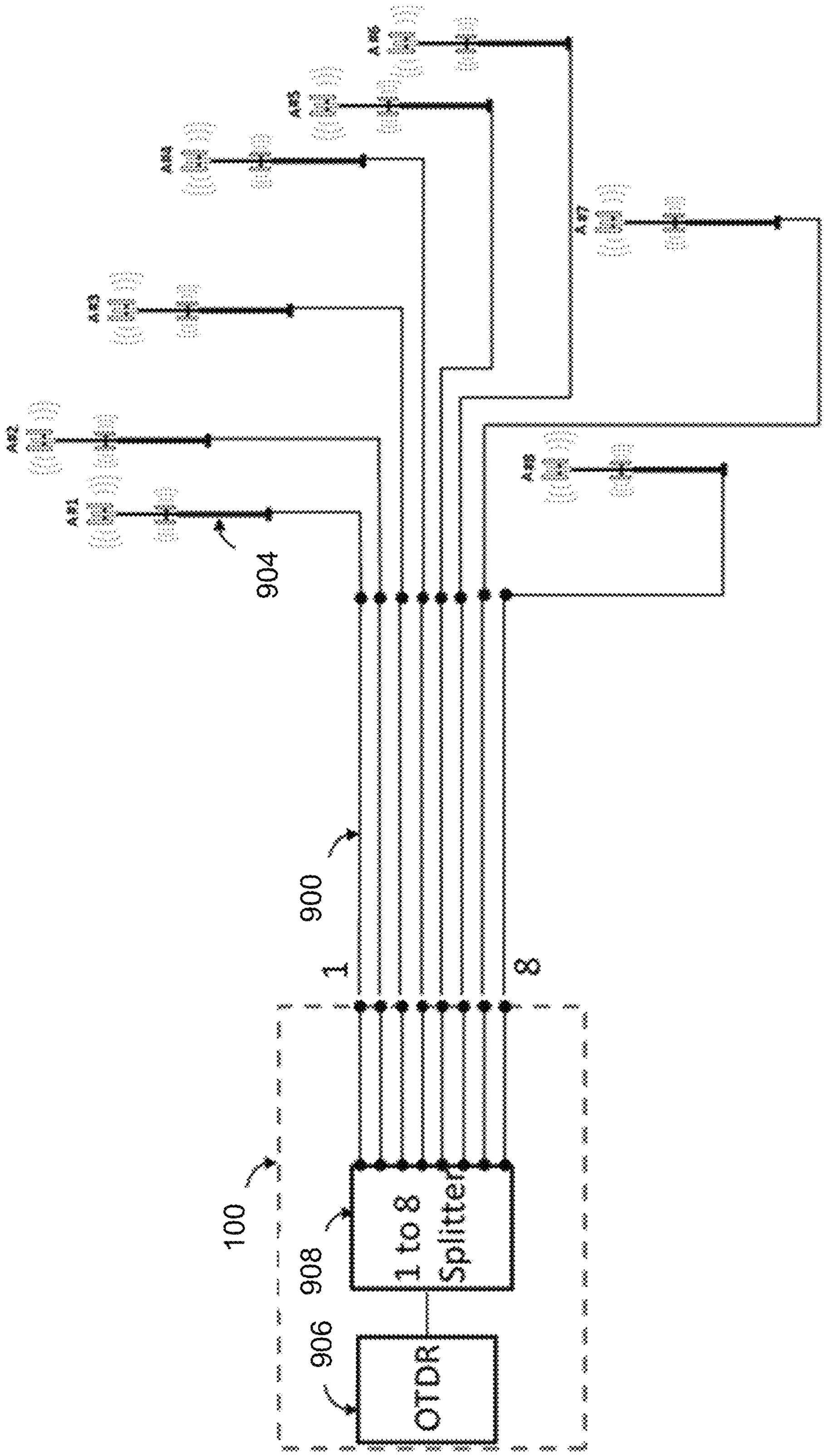
FIG. 9 illustrates operation of the optical fiber monitoring apparatus of FIG. 1, according to an example of the present disclosure.

FIG. 9 illustrates operation of the apparatus 100, according to an example of the present disclosure. A network including optical fibers connected to various antenna types may be connected to a feeder cable 900 that is further connected to the apparatus 100. The location of the different antennas 904 may make the coincidence of the appearance of the different optical fiber ends unlikely. The apparatus 100 may utilize an OTDR 906 connected to the optical splitter 908 that is in turn connected to the various optical fibers 1 to 8 of the feeder cable 900.

Figure 10A:
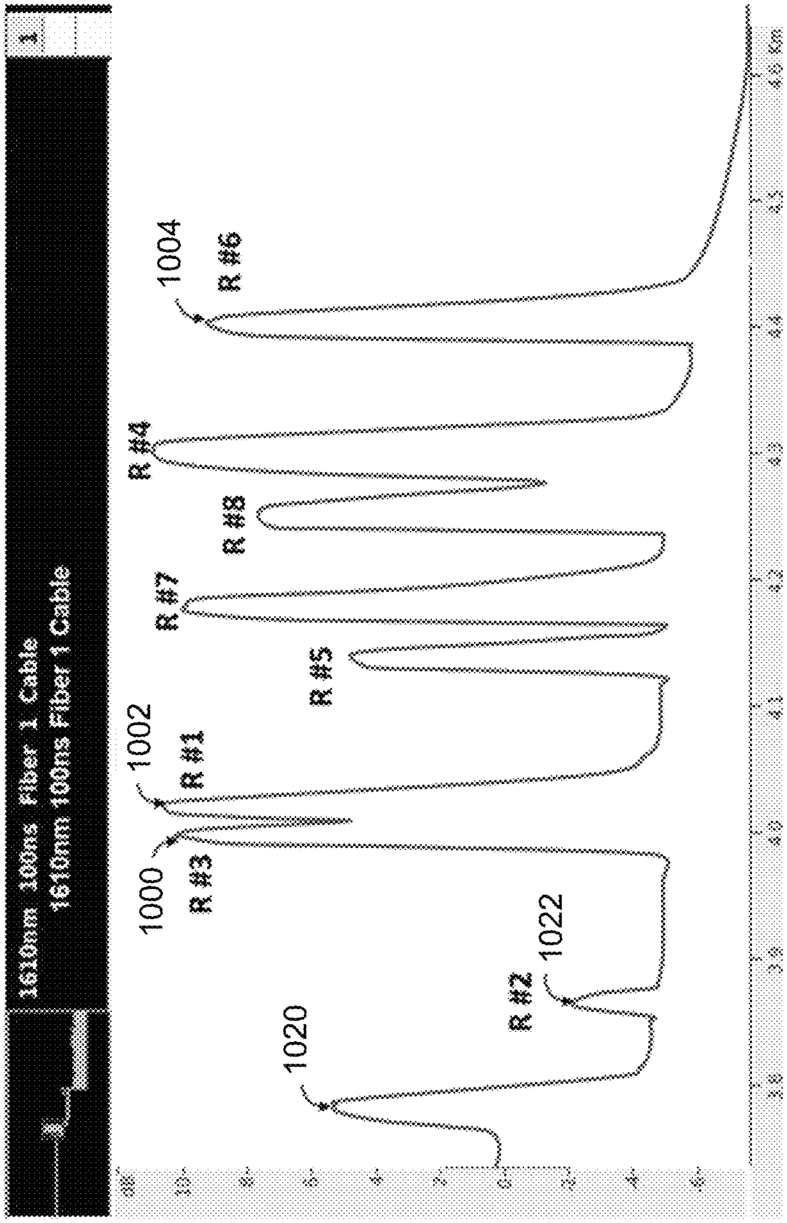
FIG. 10A illustrates an example of an OTDR trace based on the configuration of FIG. 9, according to an example of the present disclosure.

FIG. 10A illustrates an example of an OTDR trace based on the configuration of FIG. 9, according to an example of the present disclosure. Referring to FIG. 10A, the different reflective peaks from R #1 to R #8 may be visible on the OTDR trace. The first reflective event 1020 may correspond to the insertion loss and reflection at the level of the optical splitter. The shortest optical fiber may be visible by the reflective event R #2 at 1022. Reflective events #3 at 1000 and #1 at 1002 may correspond to a case where two optical fibers have similar lengths but not enough for the reflective peaks to be clearly separated from each other. Reflective peak #6 at 1004 may correspond to the antenna farthest from the OTDR.

Figure 10B:
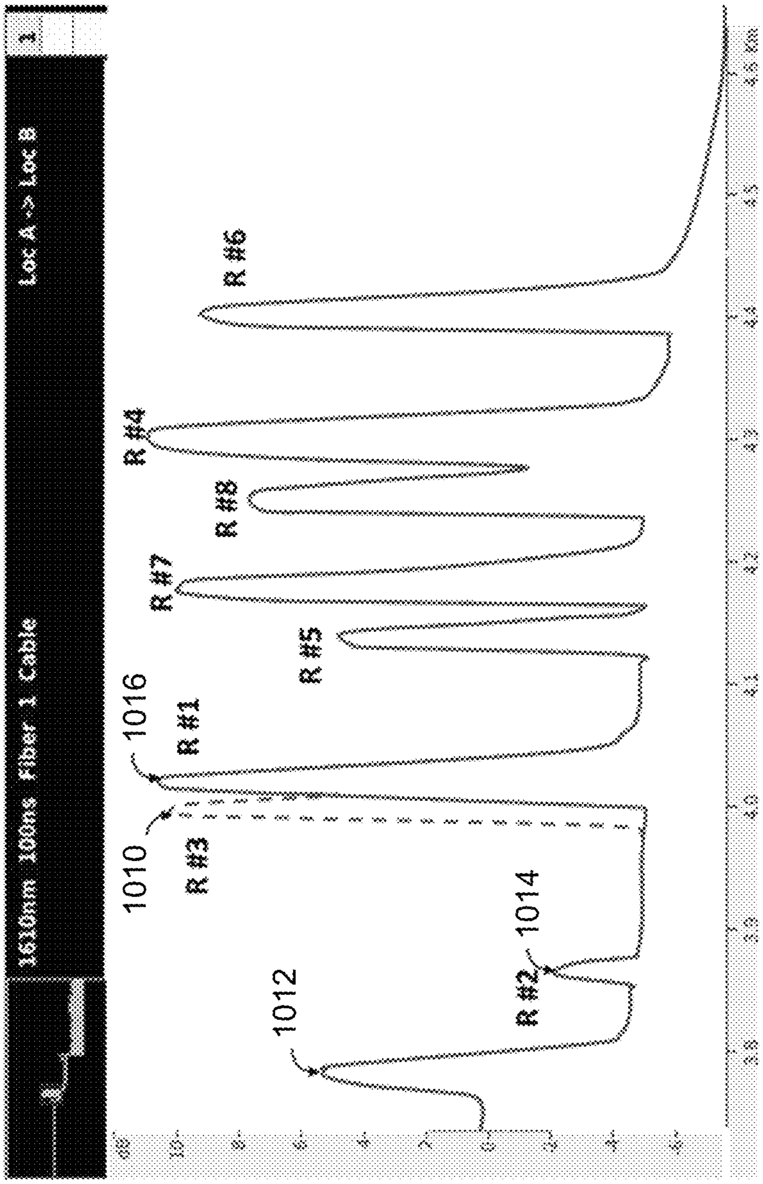
FIG. 10B illustrates an example where one of the optical fiber endings in a reflection peak is cut or has a relatively strong attenuation, according to an example of the present disclosure.

FIG. 10B illustrates an example where one of the optical fiber endings in a reflection peak is cut or has a relatively strong attenuation, according to an example of the present disclosure. Referring to FIG. 10B, one of the optical fiber endings in a reflection peak R #3 at 1010 may be cut or has a strong attenuation.

The impact on the level of backscattering may not be visible, but the disappearance of the reflective peak at 1010 (e.g., dotted line event) may be visible. The previous events 1012 and 1014 may maintain the same amplitude, and there may be no overlap between R #3 at 1010 and R #1 at 1016.

Figure 11:
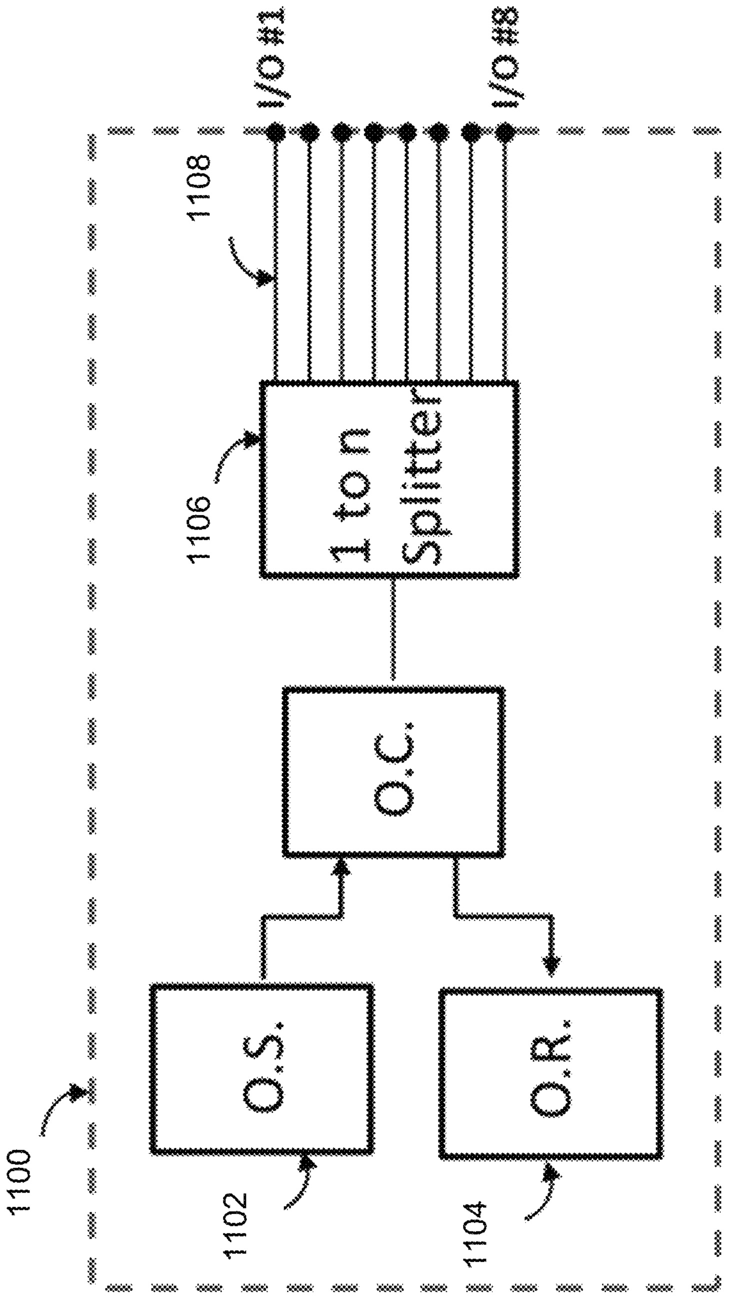
FIG. 11 illustrates a block diagram of another example of the optical fiber monitoring apparatus of FIG. 1, according to an example of the present disclosure.

FIG. 11 illustrates a block diagram of another example of an optical fiber monitoring apparatus, according to an example of the present disclosure. Referring to FIG. 11, optical fiber monitoring apparatus 1100 may include at least one optical source 1102, at least one optical reception system 1104, and a coupling system between blocks 1102 and 1104. Further, the monitoring apparatus 1100 may include optical splitter 1106 whose optical fibers 1108 allow the optical connection for the optical fiber system under test.

Figure 12:
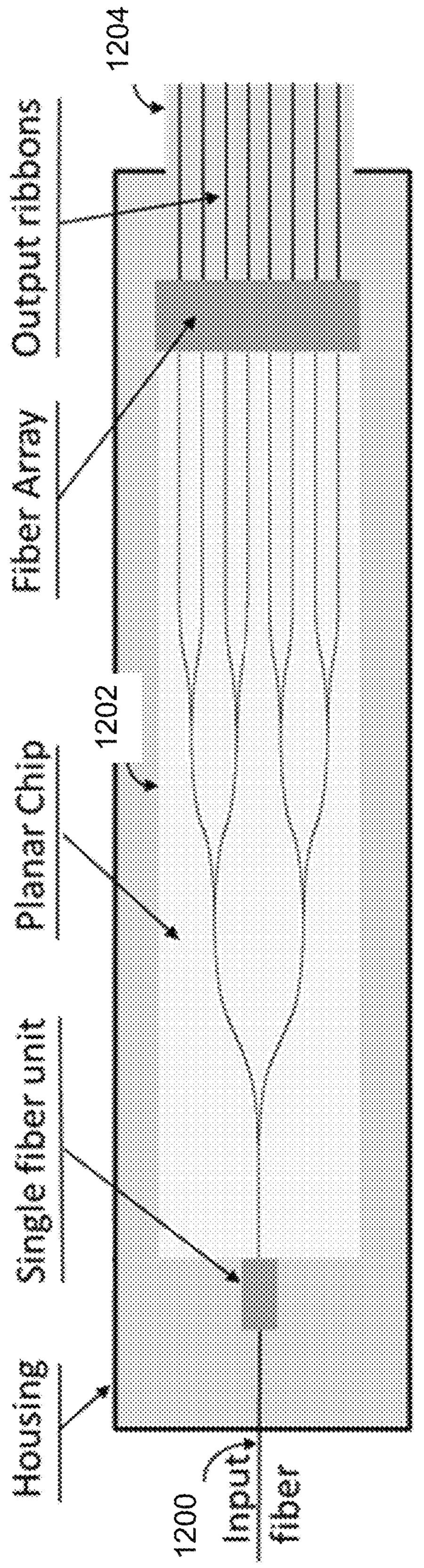
FIG. 12 illustrates implementation of planar lightwave circuit (PLC) technology that utilizes waveguides fabricated by lithography on a silica glass substrate, according to an example of the present disclosure.

FIG. 12 illustrates implementation of planar lightwave circuit (PLC) technology that utilizes waveguides fabricated by lithography on a silica glass substrate, according to an example of the present disclosure. Referring to FIG. 12, the optical fiber splitter may connect a single optical fiber 1200 to an 8-optical fiber ribbon optical fiber 1204. The tree structure of optical waveguides 1202 illustrates the three-stage signal splitting geometry. PLC splitters may include different splitting ratio, where 1×N may include 1×4, 1×8, 1×16, 2×32, 2×64, etc. The couplers may be balanced, such that power may be divided equally at each separation of the waveguides (e.g., 50/50).

Figure 13:
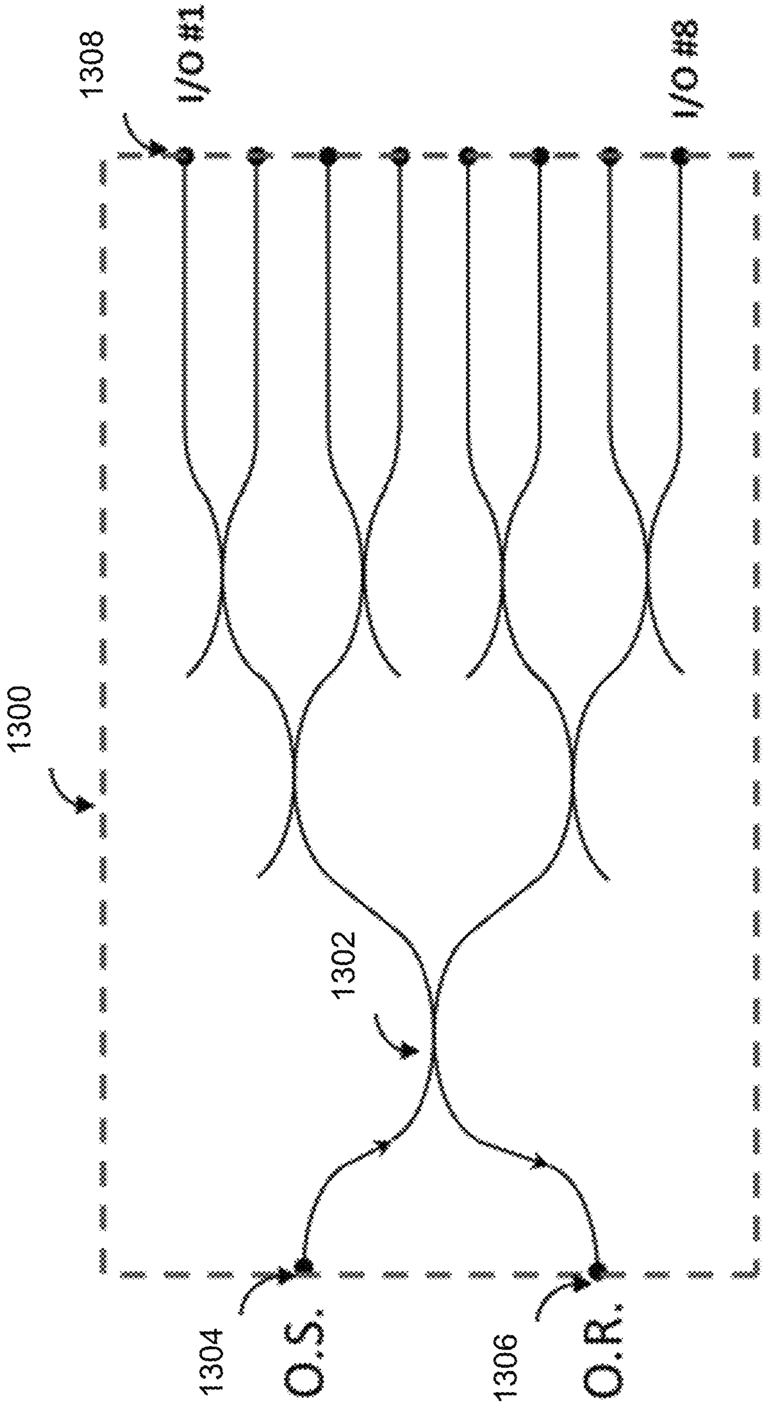
FIG. 13 illustrates implementation of another splitter technology denoted fused biconical taper (FBT), according to an example of the present disclosure.

FIG. 13 illustrates implementation of another splitter technology denoted fused biconical taper (FBT), according to an example of the present disclosure. With respect to FIG. 13, the manufacturing process may include removing the coating layer of two optical fibers, and heating and stretching the assembly. The bringing together of the two optical fibers may promote the coupling of energy between the optical fibers. This structure may control the splitting ratio by controlling the length of the twist angle and optical fiber stretch.

For FIG. 13, 2×N balanced splitters with two input optical fibers may proportionally divide the power of the optical signal. The example of FIG. 13 illustrates use of a 2×8 splitter 1300. The OTDRs incorporate a 3-port optical coupling system to allow the signal from the source to be transmitted to the fiber under test, and to allow the return signal from the fiber under test to reach the receiver of the OTDR. The first coupling stage 1302 may thus be used for a coupling system between the optical source (O.S) of OTDR connected to the optical port 1304 and the OTDR optical receiver (O.R.) to be connected to optical port 1306. The optical coupling stage 1302 of the OTDR and the distribution splitter up to the multiple-fiber 1308 may be combined as shown in a single component. The optical source of the OTDR connected to the optical port 1304 may be a low cost transmitter optical sub assembly type (TOSA) and the OTDR optical receiver connected to optical port 1306 may be a receiver optical sub assembly (ROSA) type. In another example, integrated photonics technology platforms such as photonic integrated circuits may be utilized.

Figure 14:
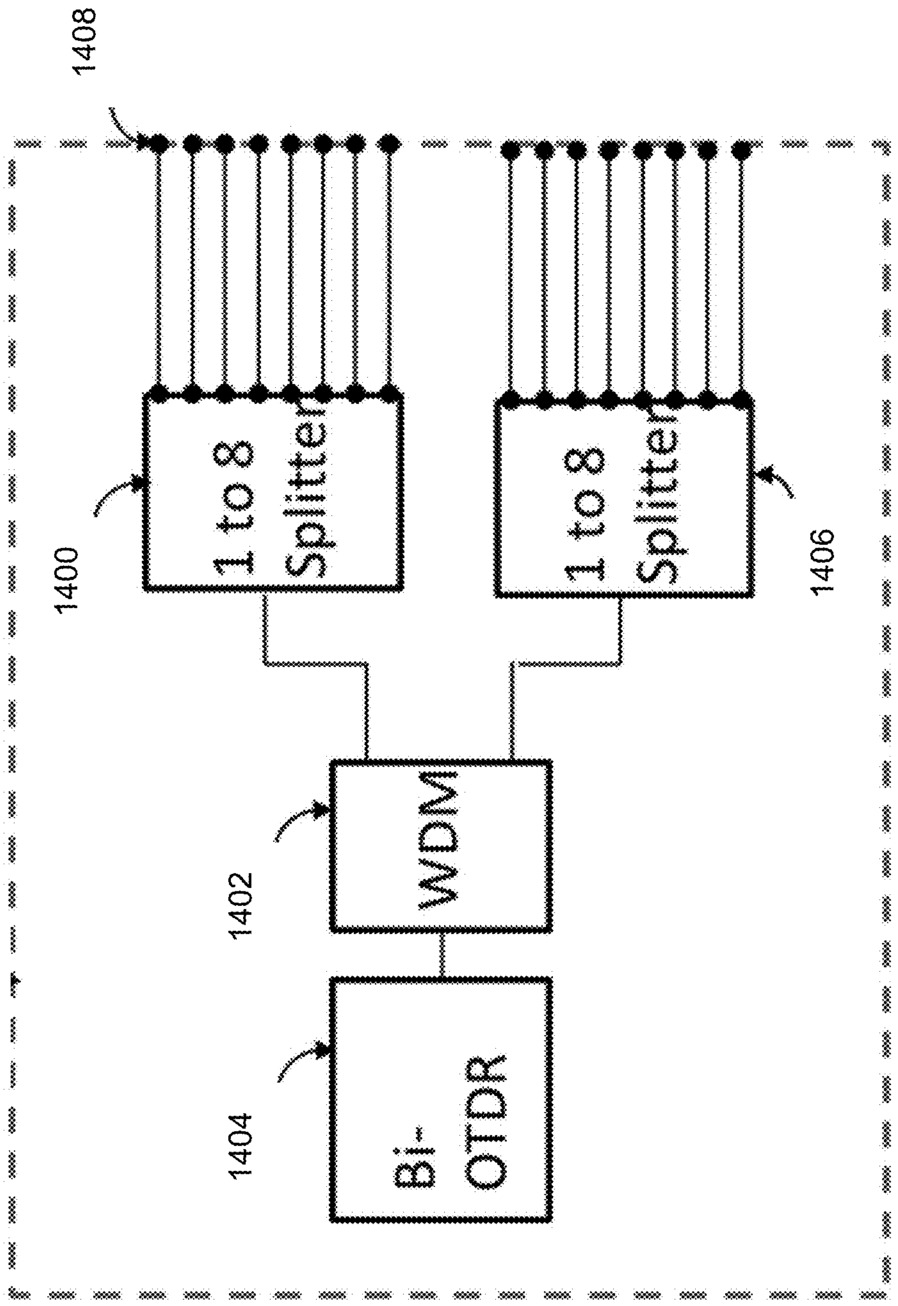
FIG. 14 illustrates another example of the optical fiber monitoring apparatus of FIG. 1 that combines the use of two splitters and a Mux/deMux, according to an example of the present disclosure.

Hybrid combinations using several coupling technologies may make it possible to extend the capacity of the apparatus 100, in particular the number of optical fibers monitored at the same time. Insertion losses of optical splitters may increase with the number of outputs. A 1×8 optical splitter may typically include an insertion loss of approximately 10 dB at 1550 nm, with another 10 dB being added for a 1×64 optical splitter. The OTDR measurement dynamics may be consumed by this optical loss and the analysis of the trace beyond the optical splitter may become technically challenging. In this regard, FIG. 14 illustrates another example of an optical fiber monitoring apparatus that combines the use of two 1×8 splitters 1400 and 1406, and a Mux/deMux 1402. A bi-OTDR 1404 capable of testing at two different wavelengths simultaneously may test via the Mux/DeMux 1402 and each of the two optical splitters 1 to 8 at 1400. In another example, the bi-OTDR 1404 may be replaced by a bi-wavelength OTDR which may alternately test each of the groups of eight optical fibers 1408 connected to each of the 1×8 optical splitters. Alternatively, the bi-OTDR 1404 may be replaced by a multi-wavelength or tunable wavelength OTDR and the bi-wavelength Mux/DeMux may be replaced by a dense or coarse wavelength division multiplexer.

Figure 15:
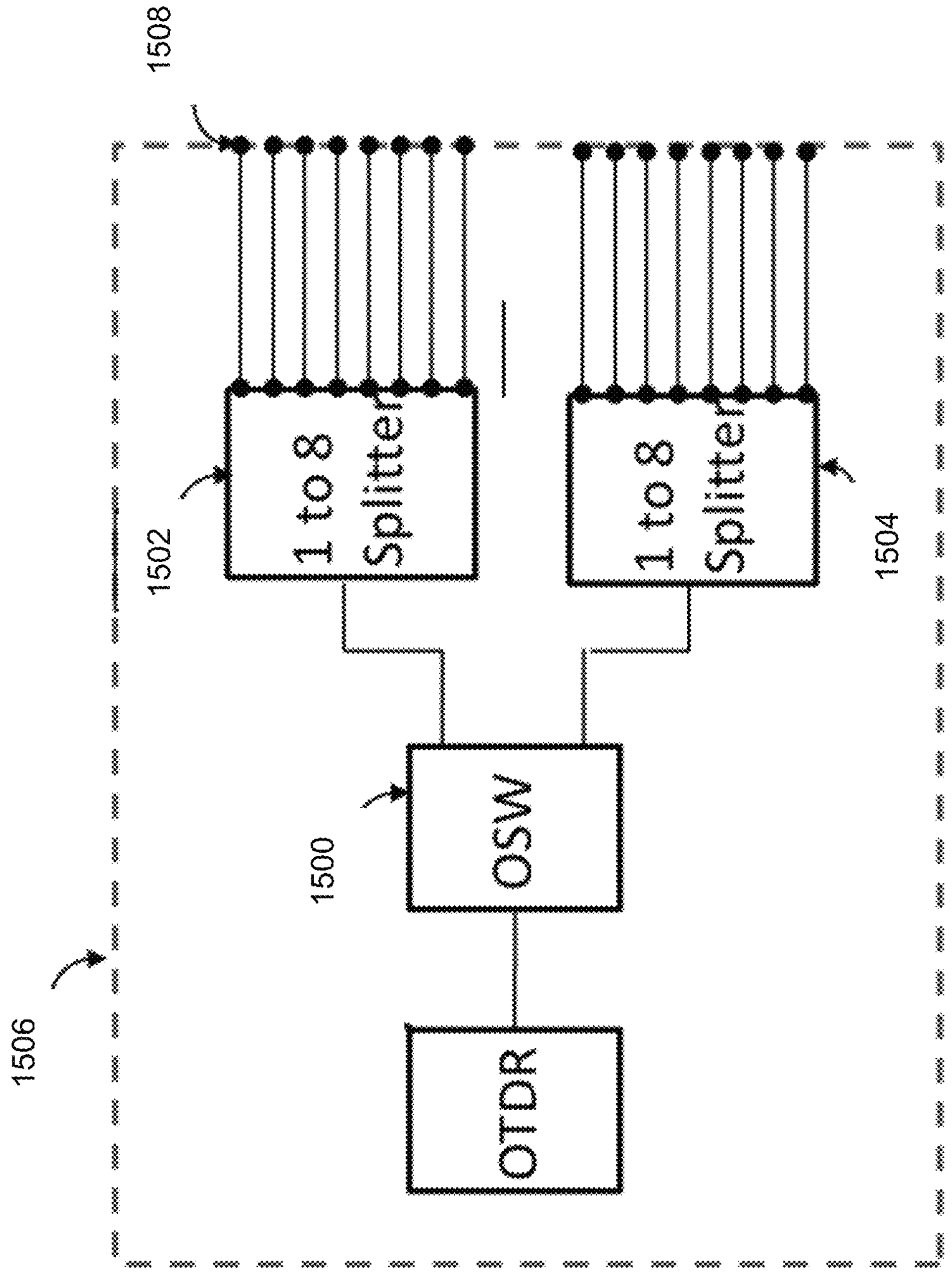
FIG. 15 illustrates utilization of an active component and passive components, according to an example of the present disclosure.

FIG. 15 illustrates utilization of an active component and passive components, according to an example of the present disclosure. With reference to the hybrid setup depicted in FIG. 15, the use of an active component 1500 (e.g., optical switch) is shown combined with passive components 1502 and 1504. In the configuration shown at 1506, optical switch 1500 may make it possible to sequentially test groups of 8 optical fibers 1508 in parallel.

Figure 16:
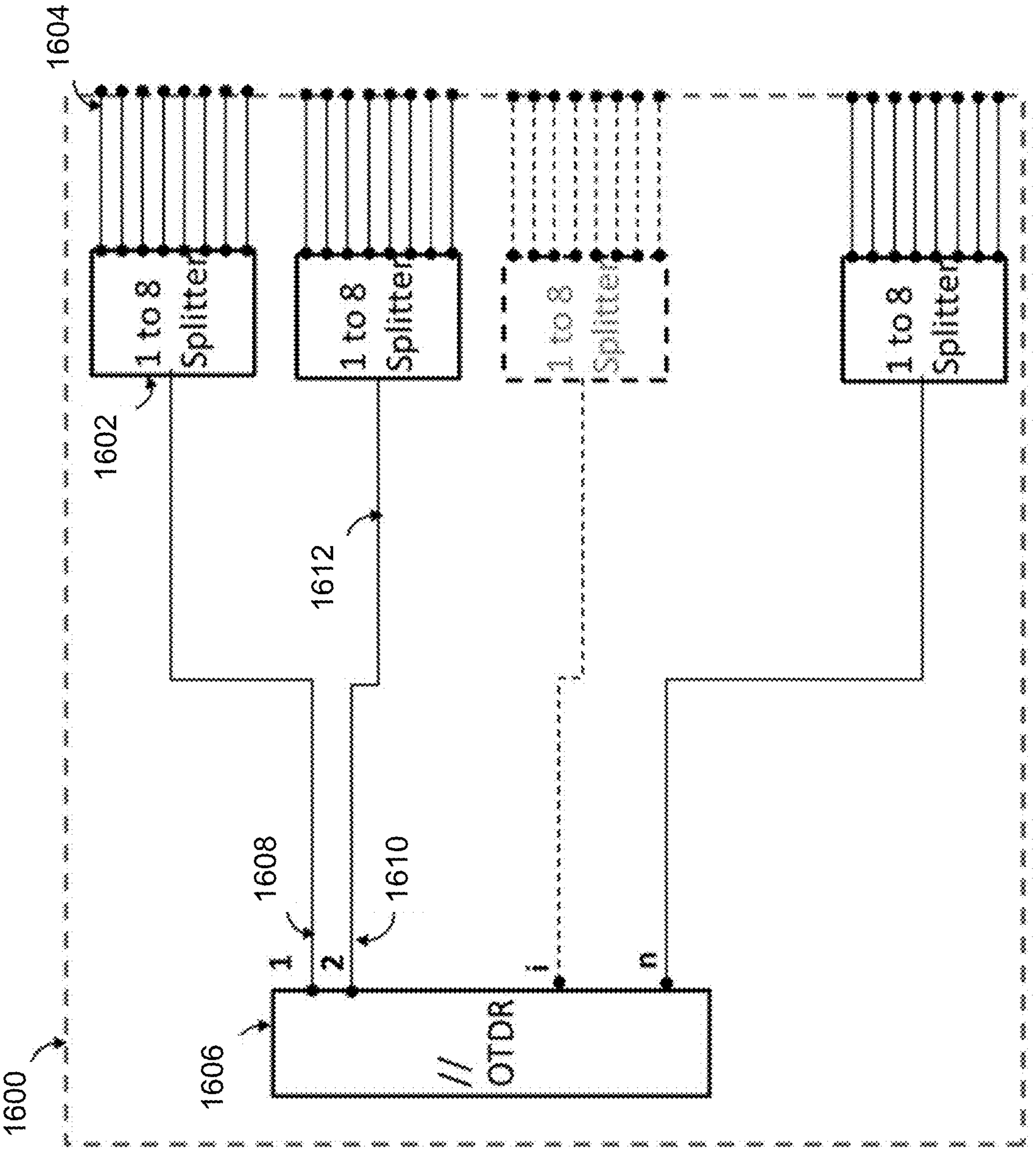
FIG. 16 illustrates the use of multi-channel OTDRs that provide for the simultaneous testing of several optical fibers, according to an example of the present disclosure.

FIG. 16 illustrates the use of multi-channel OTDRs that provide for the simultaneous testing of several optical fibers, according to an example of the present disclosure. The use of multi-channel OTDRs may provide for the simultaneous testing of several optical fibers utilizing parallel-OTDRs. In this regard, optical fiber monitoring apparatus 1600 may include a parallel multi-channel OTDR 1606, each input/output of which may be connected through an optical fiber (e.g., 1608, 1610, and 1612) to an independent 1×8 splitter (e.g., 1602, etc.), thus multiplying the number of outputs 1604 which can be monitored simultaneously.

Figure 17:
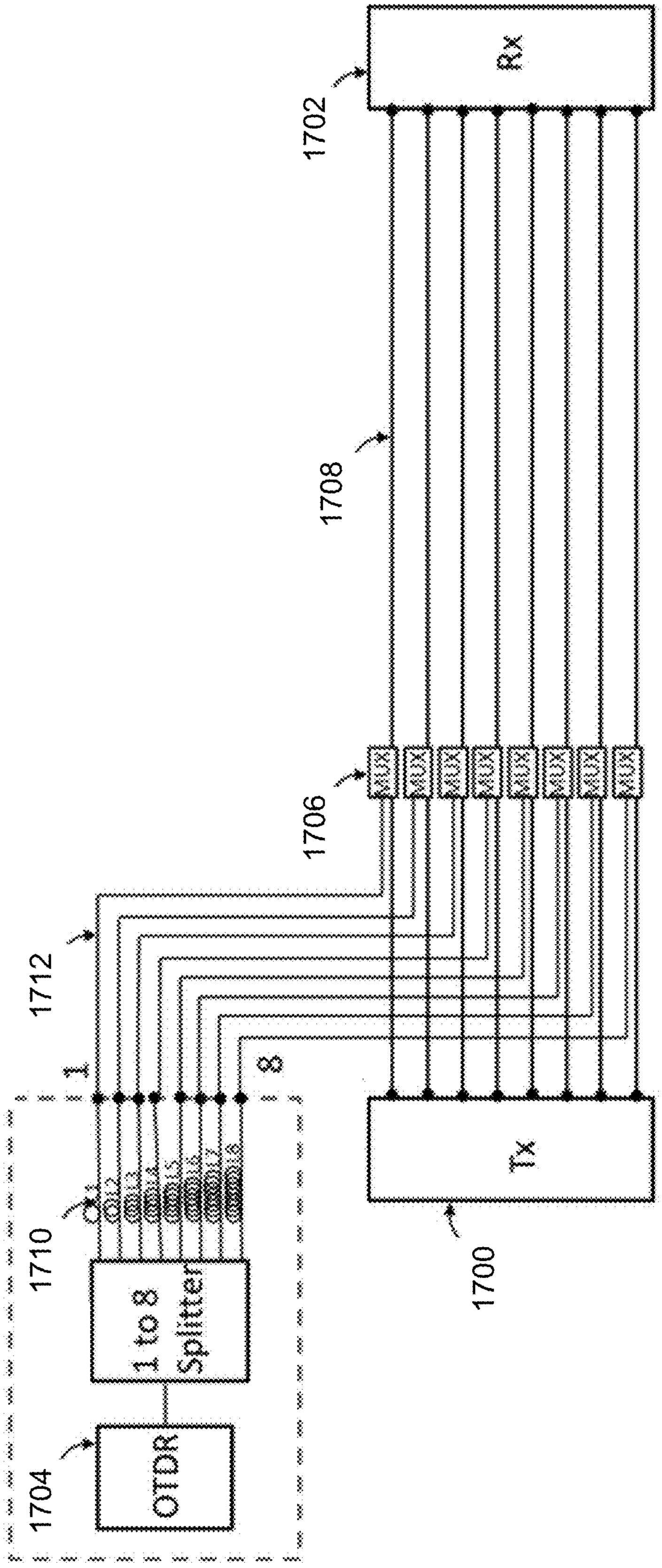
FIG. 17 illustrates testing of a network under traffic, according to an example of the present disclosure.

FIG. 17 illustrates testing of a network under traffic, according to an example of the present disclosure. Referring to FIG. 17, for the network under traffic (e.g., live-network), Tx 1700 and Rx 1702 transmission equipment may operate at a wavelength different from the test wavelength of OTDR 1704. Optical fibers 1712 and multiplexers 1706 may make it possible to insert the optical test signal on the optical cable 1708. In this regard, the solution based on the addition of overlength optical fiber 1710 may be used to avoid the coincidence of events of the different optical fiber ends. In the case of the antenna network monitoring example of FIG. 9, the overlength optical fibers may be removed.

Figure 18:
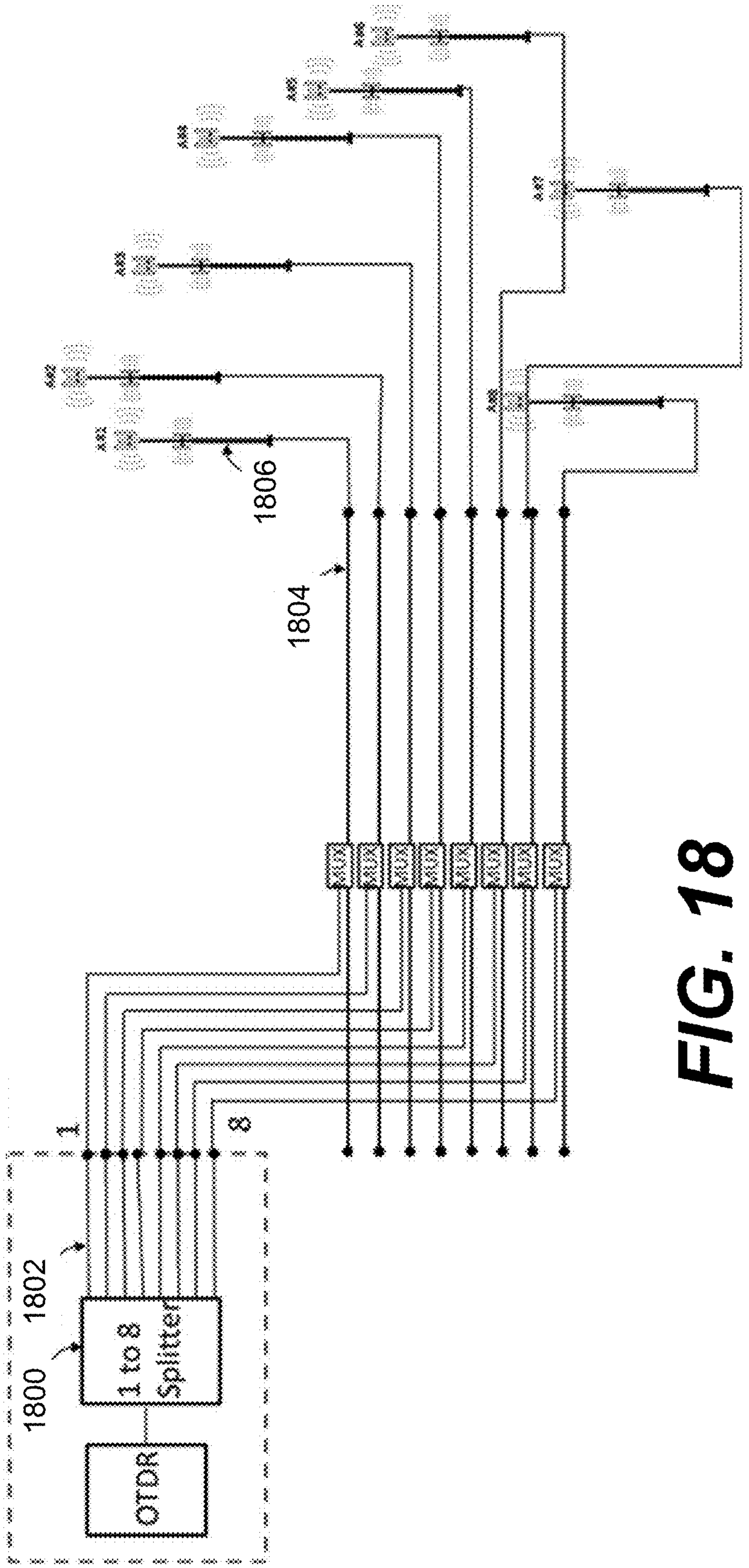
FIG. 18 illustrates removal of an overlength optical fiber, according to an example of the present disclosure.

FIG. 18 illustrates removal of an overlength optical fiber, according to an example of the present disclosure. Referring to FIG. 18, in the case of the antenna network monitoring example of FIG. 9, the overlength optical fibers may be removed. In this regard, 1×8 splitter 1800 may be directly connected to the input/output optical fibers 1 to 8 via the optical fibers 1802. Further, cable 1804 may be connected to the eight antennas 1806.

Figure 19:
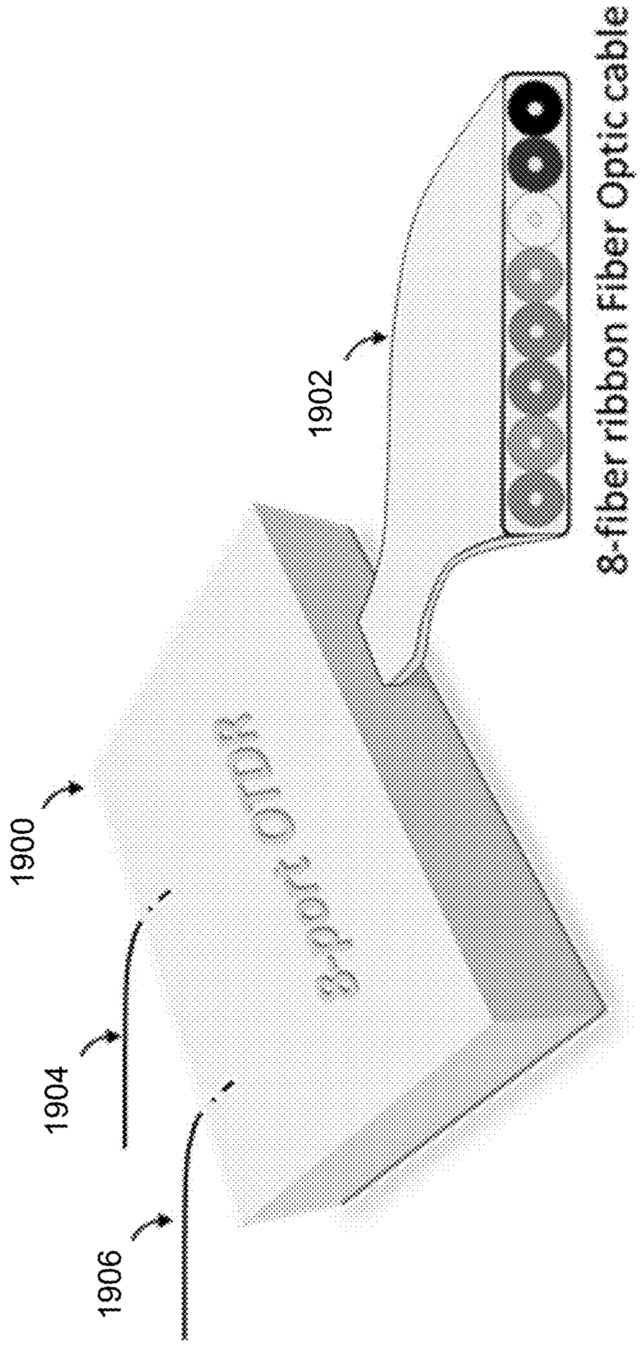
FIG. 19 illustrates implementation of a reflectometric probe with outputs on an optical fiber ribbon, according to an example of the present disclosure.

FIG. 19 illustrates implementation of a reflectometric probe with outputs on an optical fiber ribbon, according to an example of the present disclosure. With respect to FIG. 19, in another example, the apparatus 100 may be based on an OTDR system with a multi-optical fiber output and spontaneous acquisition on all of the connected optical fibers. For example, a standalone OTDR may be utilized with several optical measurement ports, based on the utilization of an on-board splitter. In this is regard, FIG. 19 illustrates implementation of a reflectometric probe 1900 with outputs on an 8-optical fiber ribbon 1902. The reflectometric probe 1900 may be powered via cable 1904 and remote controlled via an Ethernet, USB or other equivalent type of connection 1906. Alternatively, a front-end ribbon cable connector may be utilized instead of an optical fiber ribbon cable to be spliced or connected.

Figure 20A:
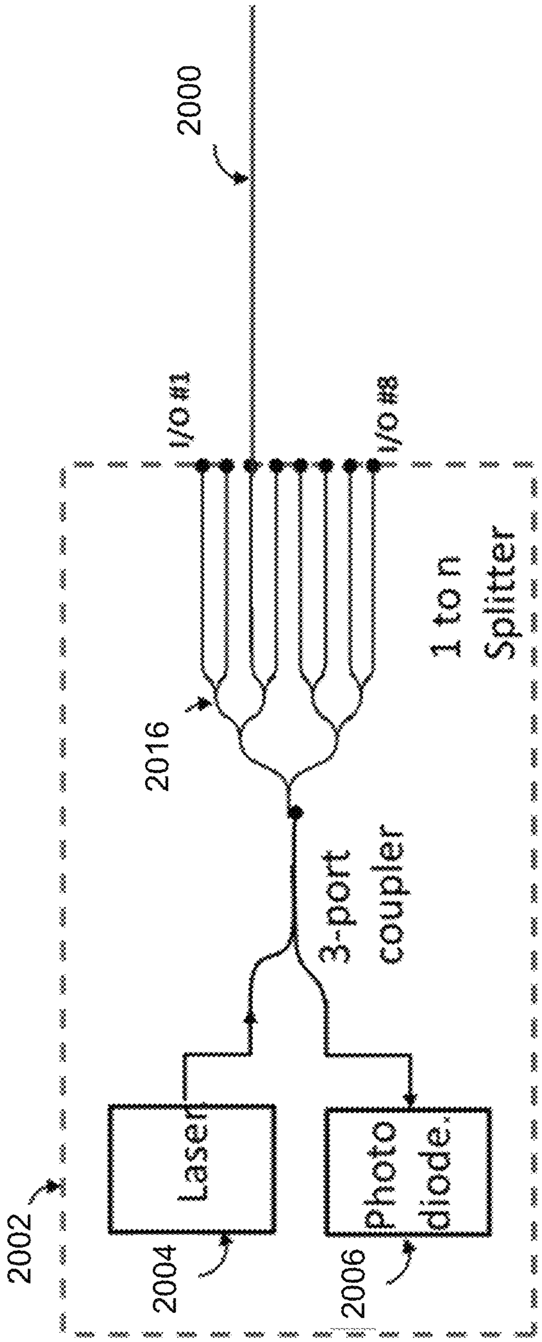
FIGS. 20A and 20B illustrate another example of the optical fiber monitoring apparatus where a single optical fiber may be connected to one of the N outputs, and an associated trace, according to an example of the present disclosure.
Figure 20B:
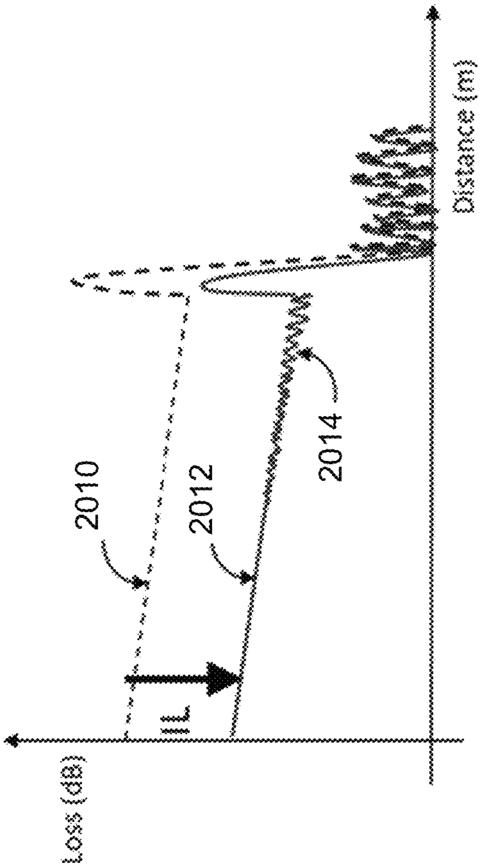

FIGS. 20A and 20B illustrate another example of the optical fiber monitoring apparatus where a single optical fiber may be connected to one of the N outputs, and an associated trace, according to an example of the present disclosure. Referring to FIG. 20A, a single optical fiber 2000 may be connected to one of the N outputs of monitoring apparatus 2002. A 3-port coupling device (2 to 1) may be used to couple the OTDR laser 2004 (e.g., OTDR source) to the fiber 2000 (e.g., fiber under test) through the 1×N splitter 2016 and to couple the signal returned by the fiber 2000 back to the OTDR photodiode 2006 (e.g., OTDR receiver). The use of a 1×N splitter 2016 may allow for simultaneous OTDR testing on all of the connected optical fibers, and may also add a relatively high insertion loss (e.g., 10 dB for a 1×8 splitter). The 1×N splitter insertion loss may reduce power of OTDR laser 2004 launched into the optical fiber 2000 and reduce the optical power returned to OTDR photodiode 2006. This optical attenuation may relatively significantly reduce the measurement dynamics of the OTDR, unlike the configuration using an optical switch. OTDR trace 2010 shown in dotted line illustrates a trace without taking into account the splitter insertion loss. OTDR trace 2012 illustrates the trace when a 10 dB loss impacts the OTDR dynamic range, including a noisy trace 2014.

Figure 21A:
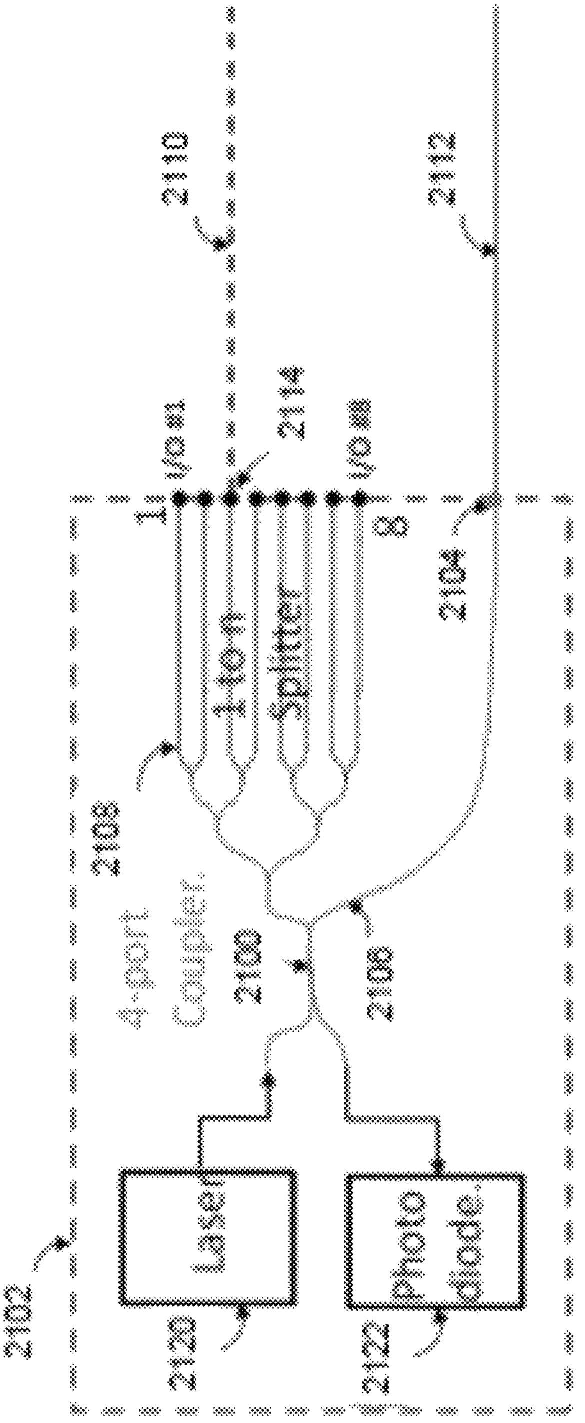
FIGS. 21A and 21B illustrate another example of the optical fiber monitoring apparatus that provides full OTDR performance by using a 4-port optical coupler, according to an example of the present disclosure.
Figure 21B:
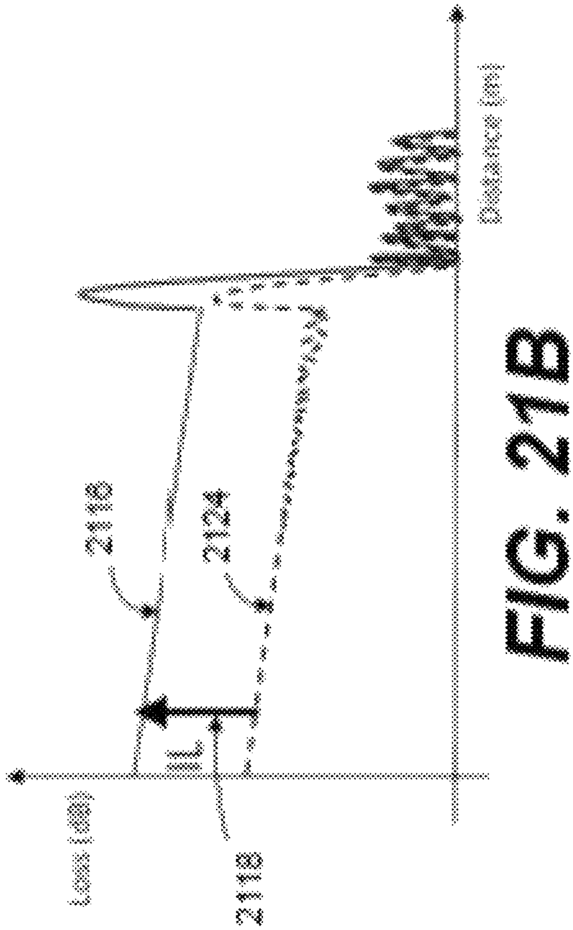

FIGS. 21A and 21B illustrate another example of optical fiber monitoring apparatus 2102 that provides full OTDR performance by using a 4-port optical coupler, according to an example of the present disclosure. For example, optical fiber monitoring apparatus 2102 of FIGS. 21A and 21B may utilize a 4-port optical coupler 2100 instead of a 3-port coupler. In some cases, 2-to-1 couplers such as the ones based on fused biconical taper (FBT) may be 2-to-2 couplers with one output not used. The 4-port optical coupler 2100 which interconnects optical source 2120, receiver 2122 and 1×N splitter 2108 does not add insertion loss compared to a 3-port coupler. The optical fiber monitoring apparatus 2102 may include an additional output 2104 connected to additional measurement port 2106 of the optical coupler 2100. Additional measurement port 2106 may be thus directly connected to the OTDR port without being impacted by the insertion loss of 1 to N splitter 2108. Optical fiber under test 2110 (shown in dashed), which was previously connected to one of the N ports 2114, may be now connected (e.g., at 2112) to the additional measurement port 2106.

FIG. 21B shows that an OTDR measurement of the optical fiber under test 2112 connected to the additional measurement port 2106 benefits from the full performance of the OTDR. The trace 2124 shown in FIG. 21B represents the OTDR trace when the optical fiber under test 2110 is connected to one of the N ports 2114. The trace 2116 shows the full OTDR trace when the same optical fiber 2112 is connected to the additional measurement port 2106 and not impacted by the insertion loss 2118 of the 1×N splitter. The additional measurement port 2106 (e.g., 4th port) of the 4-port (2 to 2) coupler 2100 may be connected to additional output 2104 (e.g., OTDR connector) with a longer optical fiber than the N-ports to avoid N-port reflectance impact. This single-optical fiber measurement function may have applications during construction, system set-up and also for troubleshooting and maintenance.

It may helpful to avoid using an additional OTDR during these different steps. This N+1 port configuration may be utilized when the lengths of two or more optical fibers under test are very close and the respective reflection peaks are difficult to distinguish. The measurement of the additional optical port may facilitate measurement of the optical fiber lengths of optical fibers of similar lengths. With this higher dynamic range with an optical fiber connected to the additional port, the OTDR may also be configured to provide improved distance location accuracy, for example by using a narrower pulse width if available on the OTDR. In this example, the use of the N optical ports and the additional port may be exclusive so as not to be disturbed by the combination of signals returned by one or more optical fibers connected to the N ports.

Thus, with respect to the 4-port optical (2 to 2) coupler between the OTDR and the 1-to-n splitter, this configuration provides for the addition of an additional measurement port with a relatively higher OTDR dynamic range than the N measurement ports from the 1-to-n splitter.

Figure 22:
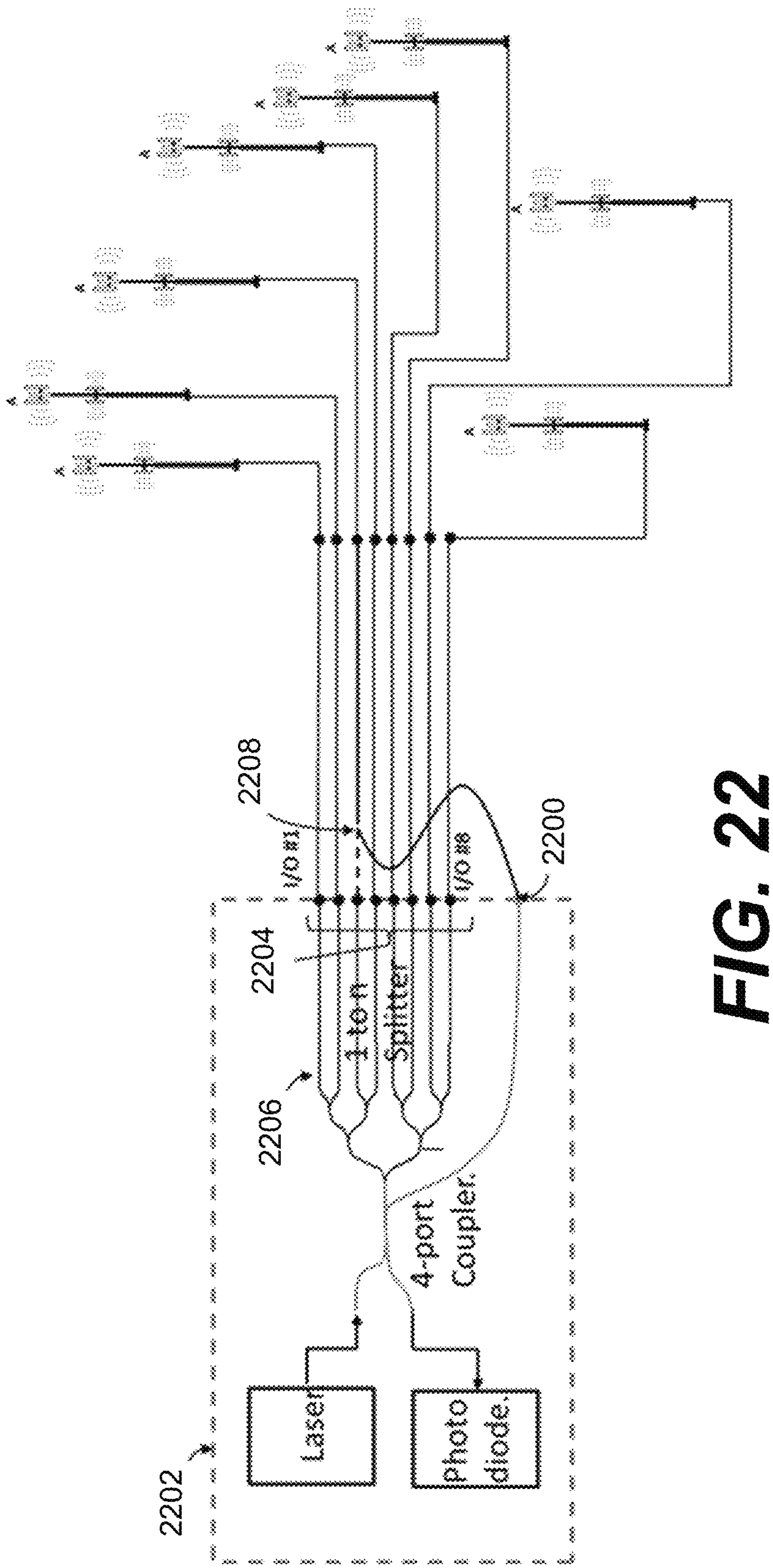
FIG. 22 illustrates another example of the optical fiber monitoring apparatus where an additional port may be used in combination with N ports connected to an optical splitter, according to an example of the present disclosure.

FIG. 22 illustrates another example of the optical fiber monitoring apparatus 2202 where an additional port 2200 may be used in combination with N ports connected to an optical splitter, according to an example of the present disclosure. Referring to FIG. 22, the additional port 2200 may be not the only one used, but may be used in combination with the N ports connected to optical splitter 2206. In this regard, additional output 2200 of the reflectometric optical fiber monitoring apparatus 2202 may be used while other optical fibers may be connected to the N ports 2204. With regards to FIG. 22, one fiber may be disconnect (e.g., fiber 2208) from one of the 1×N splitter outputs (e.g., 2204) to the additional port 2200. This may facilitate in the identification of one end of an optical fiber 2208 with respect to other ends of optical fibers of similar lengths.

Figure 23B:
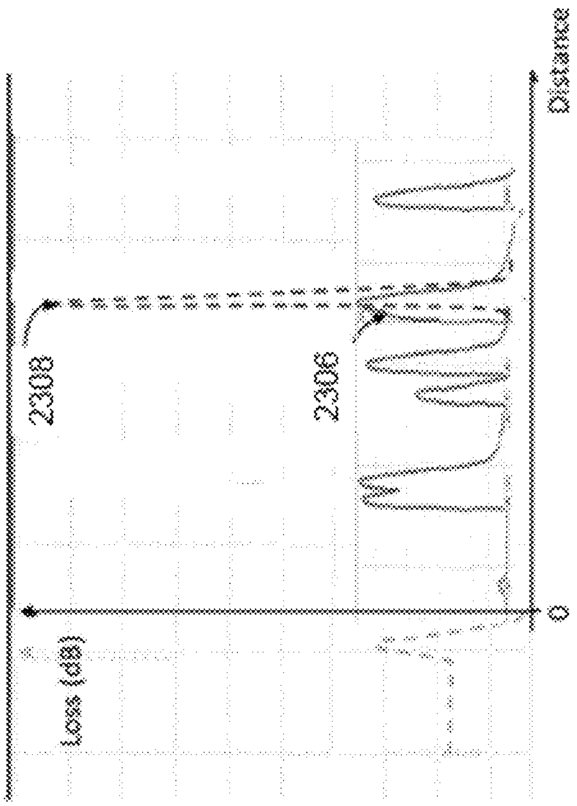
FIGS. 23A and 23B illustrate operation of the optical fiber monitoring apparatus of FIGS. 21A, 21B, and 22, according to an example of the present disclosure.
Figure 23A:
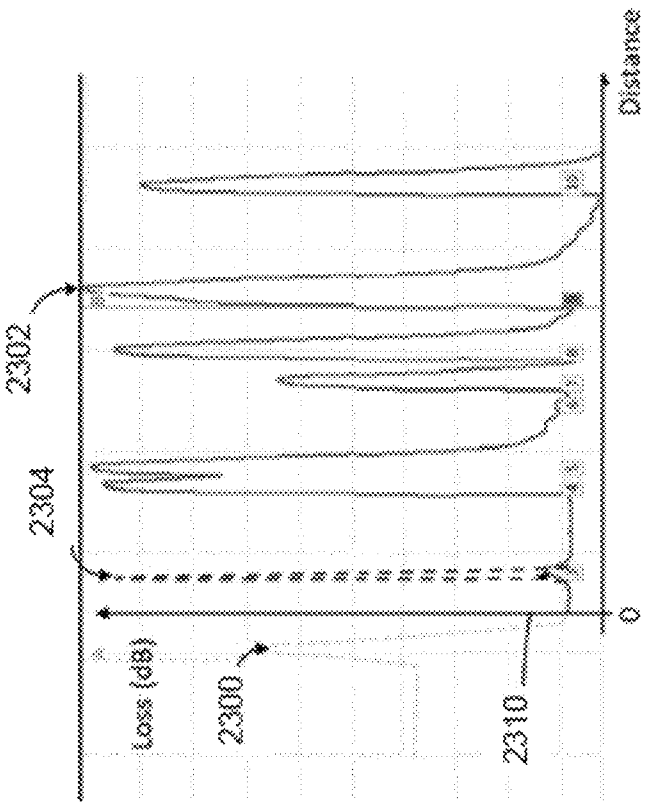

FIGS. 23A and 23B illustrate operation of the optical fiber monitoring apparatus 2102 and 2202, according to an example of the present disclosure. For example, referring to FIG. 23A, a reflective event of very low amplitude may be visible on the OTDR trace of the measurement performed on the eight output ports. The signal linked to the part situated inside the optical fiber monitoring apparatus 2102 and in particular the 1×8 splitter may be represented by the dashed line 2300. When the optical fiber whose reflective peak at 2310 is disconnected for connection to the additional port, the amplitude of the end-of-optical fiber reflection 2304 increases strongly (e.g., dotted-line event) and can be located with improved precision, for example by using a narrower test pulse. The insertion loss of the 1×N splitter is shown at 2302.

In the same manner, FIG. 23B illustrates a case of differentiating more precisely two reflective elevations 2306 which may be superimposed between the presence of optical fibers of very similar lengths. When one of the optical fibers connected to N ports is switched to the additional port, the reflective peak 2308 associated with this optical fiber appears clearly (e.g., dotted-line event) and may be precisely characterized in distance.

The optical fiber monitoring apparatus 2102 may thus associate an additional output offering a relatively higher dynamic range compared to the range available on the N outputs. In order to reduce the cost of the installed solution, a few optical fiber monitoring apparatus with this additional port may be used as an installation tool during a set-up phase (e.g., identification of the different optical fiber ends) and then replaced by the an optical fiber monitoring apparatus that does not offer this additional port.

The additional port may be used to check the quality and the intrinsic loss of any of the N+1 output connectors (e.g., if any) by connecting a simple optical fiber jumper between any of the N outputs and additional output. This solution may be based on measurement of the OTDR pulse rather than backscatter-based connector insertion loss measurement, and may provide more accurate and faster measurements. The additional port may be used as an additional monitoring port in addition to the N ports, particularly if one optical fiber link has a much higher link budget than the N fibers and requires a higher dynamic range OTDR measurement.

Figure 24:
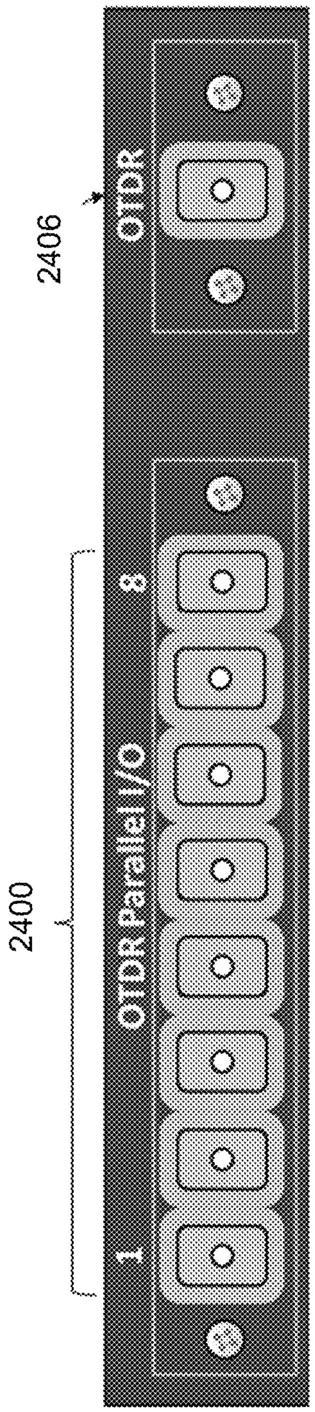
FIG. 24 illustrates an example of an arrangement of optical fiber monitoring apparatus output connectors which include N parallel test outputs and a full specification OTDR output, according to an example of the present disclosure.

FIG. 24 illustrates a possible arrangement of optical fiber monitoring apparatus output connectors which include N parallel test outputs and a full specification OTDR output, according to an example of the present disclosure. With reference to FIG. 24, the output connectors may include N parallel test outputs 2400 and a full specification OTDR output 2406. Alternatively, other types of connectors, such as a ribbon N fiber cable or multi-core fibers may be utilized.

What has been described and illustrated herein is an example along with some of its variations. The terms, descriptions and figures used herein may be set forth by way of illustration only and may be not meant as limitations. Many variations may be possible within the spirit and scope of the subject matter, which is intended to be defined by the following claims—and their equivalents—in which all terms may be meant in their broadest reasonable sense unless otherwise indicated.

What is claimed is:

1. An optical fiber monitoring apparatus comprising:
   - an optical time domain reflectometer (OTDR), wherein the OTDR is optically connected to N optical fibers, each having dedicated reflectors connected to an end to generate calibrated reflective signals for use as a reference for determining an attenuation for each of the N optical fibers, wherein N is greater than one; and
   - a 1×N optical splitter that is optically connected to the OTDR, wherein the 1×N optical splitter utilizes a planar lightwave circuit (PLC) having a waveguide on a silica glass substrate to implement a plurality of splitting ratios,
   - wherein N is greater than one,
   - wherein the 1×N optical splitter includes N test port optical fiber outputs,
   - an optical coupler optically inserted between an OTDR optical source and an OTDR optical receiver and the 1×N optical splitter, wherein the optical coupler includes an additional output connected to an additional measurement port of the optical coupler, and wherein the additional measurement port is used to directly connected to one of the N optical fibers, and operates without being impacted by insertion loss of the 1 to N optical splitter, and
   - wherein the OTDR is a simultaneous multi-channel OTDR having multiple, parallel inputs/outputs each coupled through a dedicated optical fiber to one of a plurality of 1×N independent splitters, wherein the plurality of 1×N independent splitters includes the 1×N optical splitter, and further wherein each test port optical fiber output is optically connectable to an optical fiber to optically connect the optical fiber to the OTDR for simultaneous monitoring of each test port optical fiber output by the OTDR.

2. The optical fiber monitoring apparatus according to claim 1, wherein the OTDR is optically connected to N optical fibers including the optical fiber to extract, from each optical fiber of the N optical fibers, information by analyzing signals returned from the N optical fibers to the N test port optical fiber outputs.

3. The optical fiber monitoring apparatus according to claim 1, wherein the OTDR is optically connected to N optical fibers including the optical fiber to compare, for the N optical fibers, N simultaneous test results to a reference test result to identify changes on at least one optical fiber under test of the N optical fibers.

4. The optical fiber monitoring apparatus according to claim 1, further comprising:
   - N optical fibers of different lengths optically inserted between the N test port optical fiber outputs and N optical fibers including the optical fiber, wherein the N optical fibers are optically connected to the N test port optical fiber outputs.

5. The optical fiber monitoring apparatus according to claim 1, further comprising:
   - N antennas connected to N optical fibers including the optical fiber, wherein the N optical fibers are optically connected to the N test port optical fiber outputs.

6. The optical fiber monitoring apparatus according to claim 1, wherein the OTDR is a multi-wavelength OTDR, further comprising:
   - a multi-wavelength multiplexer/demultiplexer optically inserted between the OTDR and the plurality of 1×N independent splitters.

7. The optical fiber monitoring apparatus according to claim 1, wherein the OTDR operates at a different wavelength than a traffic wavelength, further comprising:
   - a wavelength dependent multiplexer to insert a test signal on the optical fiber.

8. The optical fiber monitoring apparatus according to claim 1, further comprising a receiver including a photodiode.

9. An optical fiber monitoring apparatus comprising:
   - an OTDR including an OTDR optical source, wherein the OTDR is optically connected to N optical fibers, each having dedicated reflectors connected to an end to generate calibrated reflective signals for use as a reference for determining an attenuation for each of the N optical fibers, wherein N is greater than one, and
   - wherein the OTDR is a simultaneous multi-channel OTDR having multiple, parallel inputs/outputs each coupled through a dedicated optical fiber to one of a plurality of 1×N independent splitters;
   - an OTDR optical receiver; and
   - an optical coupler optically inserted between the OTDR optical source and the OTDR optical receiver, and a 1×N optical splitter, wherein the plurality of 1×N independent splitters includes the 1×N optical splitter, wherein the 1×N optical splitter utilizes a planar lightwave circuit (PLC) having a waveguide on a silica glass substrate to implement a plurality of splitting ratios, wherein the optical coupler includes an additional output connected to an additional measurement port of the optical coupler, and wherein the additional measurement port is used to directly connected to one of the N optical fibers, and operates without being impacted by insertion loss of the 1 to N optical splitter;
   - wherein N is greater than one,
   - wherein the 1×N optical splitter includes N test port optical fiber outputs, and
   - wherein each test port optical fiber output is optically connectable to an optical fiber to optically connect the optical fiber to the OTDR optical source and the OTDR optical receiver for simultaneous monitoring of each test port optical fiber output by the OTDR.

10. The optical fiber monitoring apparatus according to claim 9, wherein the OTDR optical source includes a laser.

11. The optical fiber monitoring apparatus according to claim 9, wherein the OTDR optical receiver includes a photodiode.

12. The optical fiber monitoring apparatus according to claim 9, wherein the optical coupler is an M-port optical coupler.

13. The optical fiber monitoring apparatus according to claim 12, wherein M is equal to three.

14. An optical fiber monitoring apparatus comprising:

an optical time domain reflectometer (OTDR), wherein the OTDR is optically connected to N optical fibers, each having dedicated reflectors connected to an end to generate calibrated reflective signals for use as a reference for determining an attenuation for each of the N optical fibers, wherein N is greater than one, wherein the OTDR is a simultaneous multi-channel OTDR having multiple, parallel inputs/outputs each coupled through a dedicated optical fiber to one of a plurality of 1×N independent splitters;

a 1×N optical splitter that is optically connected to the OTDR to test at least one optical fiber of N optical fibers that are optically connected to the 1×N optical splitter, wherein the plurality of 1×N independent splitters includes the 1×N optical splitter, wherein the 1×N optical splitter utilizes a planar lightwave circuit (PLC) having a waveguide on a silica glass substrate to implement a plurality of splitting ratios, wherein the 1×N optical splitter includes N test port optical fiber outputs for simultaneous monitoring of each test port optical fiber output by the OTDR, wherein N is greater than one; and an optical coupler optically inserted between an OTDR optical source and an OTDR optical receiver and the 1×N optical splitter, wherein the optical coupler includes an additional output connected to an additional measurement port of the optical coupler, and wherein the additional measurement port is used to directly connected to one of the N optical fibers, and operates without being impacted by insertion loss of the 1 to N optical splitter.

15. The optical fiber monitoring apparatus according to claim 14, wherein the OTDR is optically connected to the N optical fibers to extract, from each optical fiber of the N optical fibers, information by analyzing signals returned from the N optical fibers.

16. The optical fiber monitoring apparatus according to claim 14, wherein the OTDR is optically connected to the N optical fibers to compare, for the N optical fibers, N simultaneous test results to a reference test result to identify changes on at least one optical fiber under test of the N optical fibers.

17. The optical fiber monitoring apparatus according to claim 14, wherein the OTDR operates at a different wavelength than a traffic wavelength.

18. The optical fiber monitoring apparatus according to claim 14, further comprising a wavelength dependent multiplexer to insert a test signal.

19. The optical fiber monitoring apparatus according to claim 14, further comprising a receiver including a photodiode.

* * * * *